United States Patent [19]

Jensen et al.

[11] Patent Number: 4,572,752
[45] Date of Patent: Feb. 25, 1986

[54] CONTROL STRETCH LAMINATING DEVICE

[75] Inventors: James W. Jensen, Boulder; Joseph R. Haake, Broomfield, both of Colo.

[73] Assignee: Adolph Coors Company, Golden, Colo.

[21] Appl. No.: 624,480

[22] Filed: Jun. 22, 1984

Related U.S. Application Data

[63] Continuation-in-part of Ser. No. 441,276, Nov. 12, 1982, Pat. No. 4,496,417.

[51] Int. Cl.⁴ .............................................. B65B 41/18
[52] U.S. Cl. ..................... 156/64; 156/361; 156/495; 226/27
[58] Field of Search ............ 156/361, 324, 244.1, 156/350, 64, 433, 436; 226/27-31; 53/51

[56] References Cited

U.S. PATENT DOCUMENTS

| | | | |
|---|---|---|---|
| 2,682,909 | 7/1954 | Claff et al. ......................... | 156/436 |
| 3,326,436 | 6/1967 | Huck ................................... | 226/30 X |
| 3,559,568 | 2/1971 | Stanley .............................. | 226/28 X |
| 4,129,238 | 12/1978 | Herd ................................... | 226/29 |
| 4,316,566 | 2/1982 | Arleth et al. ....................... | 53/51 X |
| 4,400,230 | 8/1983 | Wyslotsky ......................... | 156/361 X |

Primary Examiner—David Simmons
Attorney, Agent, or Firm—Klaas & Law

[57] ABSTRACT

A laminating apparatus for laminating plastic film material to a paper backing material to form a laminated composite. The apparatus comprises mechanical stretch control means for controlling the stretch or relaxation of the film material prior to lamination with the paper material. The apparatus also comprises means for monitoring the amount of film stretch in the laminated composite and providing data therefrom to a data processing unit which provides control signals to operate the mechanical stretch controlling means. Speed control means are additionally provided for each of the paper supply means, film supply means and composite web take up means.

22 Claims, 14 Drawing Figures

CONTROL STRETCH LAMINATING DEVICE

This application is a continuation-in-part of application Ser. No. 441,276, filed Nov. 12, 1982, now U.S. Pat. No. 4,496,417.

BACKGROUND OF THE INVENTION

The present invention relates generally to the production of laminated paper products and more particularly to a method of lamination and a device for laminating a continuous roll of extensible plastic film material to a continuous roll of paper backing material wherein the device has a system for controlling the amount of stretch in the plastic film material to ensure proper registry of the film material with the paper material.

Lamination of a plastic film material to a paper material has been found to be particularly advantageous where paper products having high strength and abrasion resistant qualities are required. Such laminated composites are particularly desireable in the packaging industry, where artwork may be printed on the interior side of the plastic film to produce a high quality display package. The construction and use of such laminated composites are described in Peer, U.S. Pat. No. 4,254,173 which is hereby incorporated by reference.

In producing a laminated composite of the type described in Peer, both the plastic film material and the paper material may be provided in continuous sheets from spools. The paper and the plastic film generally pass over a number of roller type devices where each of the materials are independently stretched out under tension and treated as necessary depending upon the particular end use for the laminated composite. For example the plastic material may be irradiated in conventional processes to increase its strength or improve its printability. In preferred embodiments the plastic is printed with various graphics and provided with a metalized background over the graphics to enhance the package appearance. The paper may undergo treatment as well such as being electrostatically charged to aid in the bonding process. Either the film material or the paper material or both are treated thereafter with suitable adhesive to provide a bond between the paper and film. To complete the laminating process, the paper and film material are pressed together between opposed rollers to produce a smooth flat composite. Various heating or cooling processes may also be required to ensure proper adhesion of the surfaces, depending on the type of the film, paper, and adhesive agent which are being used in the process. The end product of the process is a laminated composite which may be fed directly to cutting dies or other machines for further processing. The composite may also be taken up directly on a separate spool for storage and later processing.

Use of the film/paper composite provides many advantages over conventional packaging material but also creates some unique problems. In order to be cost effective, the plastic material used is generally quite thin; on the order of 0.25-2.0 mils. Plastic films of such thicknesses tend to stretch or shrink during the lamination process as a result of variations in temperature and the different inertial forces exerted on the film as it is unrolled and processed prior to bonding with the paper. Such stretching and shrinking may cause warping or buckling in the laminated composite as the film returns to a steady state condition. Similarly, a printed image may be repeated on the film for later lamination, in registry with predetermined lengths of paper material. In such cases the printed image length must be held within close tolerances in order to permit proper registery with other processing activities such as automated cutting in a later process step.

Thus it can be seen that a need exists for a paper/film laminating device which is capable of controlling the amount of stretch in the plastic film material prior to lamination.

SUMMARY OF THE INVENTION

The present invention comprises a laminating device and method for applying extensible plastic film material to paper material in a manner which monitors and controls the amount of stretch in the plastic material. The film material is unwound from a film spool by two or more drawing rolls. The film passes through the drawing rolls in a manner which produces sufficient frictional contact for drawing the film from the film spool without slippage at the drawing rolls. Many wrapping variations might be used. It has been found that a so-called "S-wrap" configuration over two rolls is a very effective means for producing this drawing or "nip" effect. Pinch rolls sometimes referred to as nip rolls are also effective draw rolls. A combination "S-wrap" nip roll configuration may also be used. In a preferred embodiment the film material, after passing through the draw rolls, passes over one or more idler rolls which position the film at a proper angle for entry into a laminating nip formed by two or more laminating rolls. The laminating nip is generally formed by a power driven main roll and a compression roll positioned in touching or near touching contact therewith. The paper and film are drawn by the laminating rolls while being compressed between them. Thus the film material is conveyed by two separate motive means which in a preferred embodiment comprise the drawing rolls and the laminating rolls. By varying the speed of one set of rolls with respect to the other set of rolls the tension in the film web between the two sets of rolls may be increased or decreased causing the film to correspondingly stretch or relax prior to entering the laminating rolls. Although such stretch control might be obtained by use of spaced apart drawing means other than the lamination rolls, use of the laminating rolls for this purpose eliminates the need for additional rolls and achieves the result of simultaneously stretching the film to a proper length while laminating it with the paper material.

As the laminated composite leaves the laminating rolls, monitoring means such as one or more photoelectric assemblies can be provided to detect the passage of preprinted marks on the film. This information is supplied to a data processing unit which detects any variance between the design (ideal) distance and the actually measured distance between the marks. The information from the photoelectric assemblies is processed by a data processing unit in a manner which provides a output command signal to the driving means for the draw rolls to automatically adjust the surface component of rotational speed of the draw rolls with respect to the surface component of rotational speed of the laminating rolls in order to provide a proper amount of stretch in the film. Information may be displayed in operator readable form to allow the operator to input certain time response commands relating to the system operation.

The draw rolls and laminating rolls may be driven by separate drive units such as individual electric motors which are "slaved together" i.e. phase locked together by appropriate control circuitry. In another embodiment, a single main drive unit for both roll systems is used with a direct current correction motor (trim motor) and differential drive system provided for increasing or decreasing the speed of the draw rolls above or below a base speed component provided by the main drive unit.

It is among the objects of the present invention to provide a laminating device for forming a plastic paper composite wherein the stretch of the film material is monitored and controlled.

It is a further object of the invention to provide a film/paper laminating device wherein the film stretch is monitored by a photoelectric sensing system.

It is a further object of the invention to provide a film/paper laminating device utilizing S-wrap rolls or nip rolls to control the amount of stretch in the plastic film prior to lamination.

It is a further object of the invention to provide a film/paper laminating device which utilizes a data processing means as a component of the control system.

It is a further object of the invention to provide a film/paper laminating device which is safe, efficient and cost effective to operate.

BRIEF DESCRIPTION OF THE DRAWING

Various illustrative embodiments of the invention are shown in the accompanying drawing in which.

DETAILED DESCRIPTION OF THE INVENTION

Figure 1:
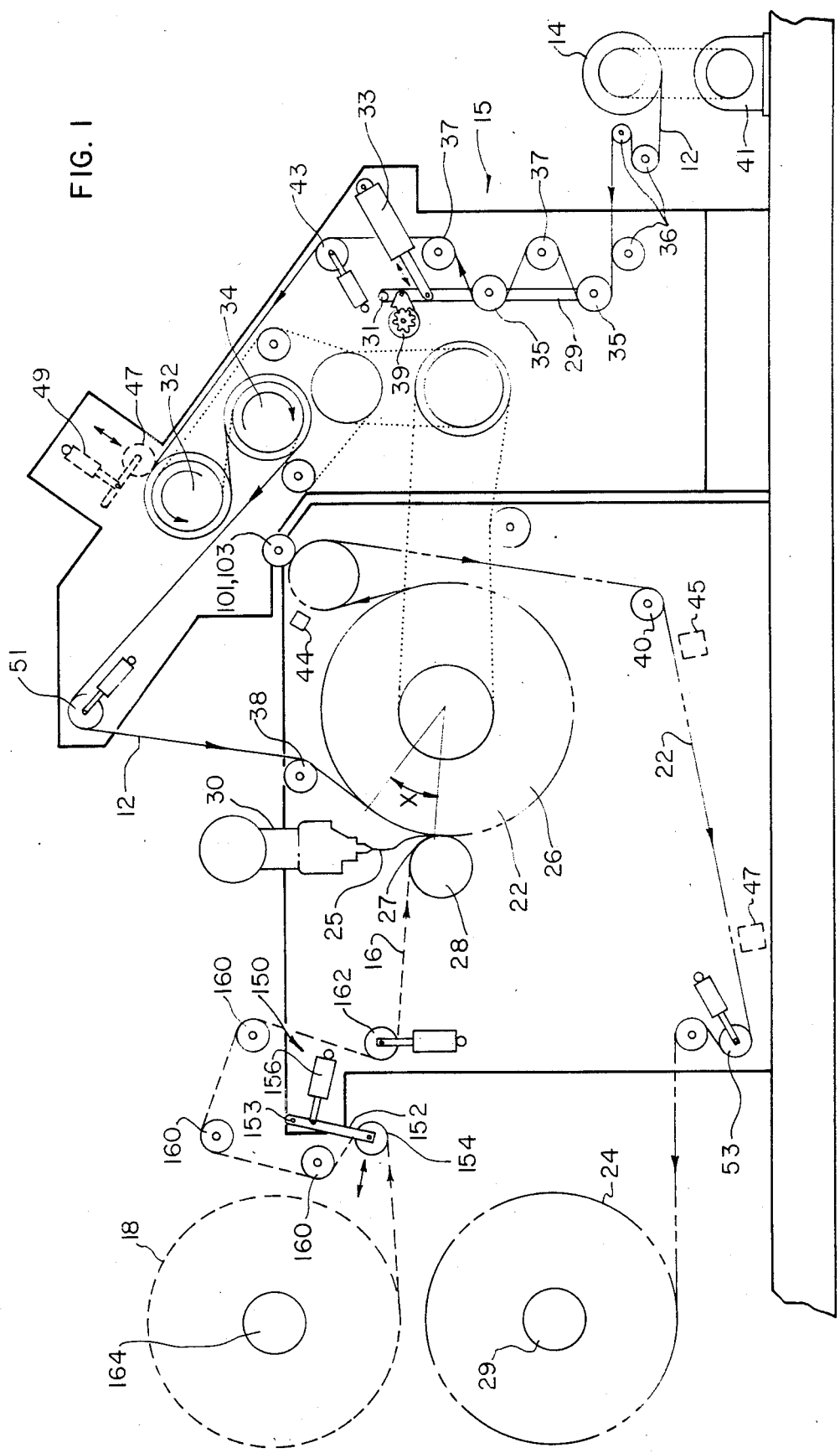
FIG. 1X is a schematic side elevation view showing the operation of a laminating device.
Figure 2:
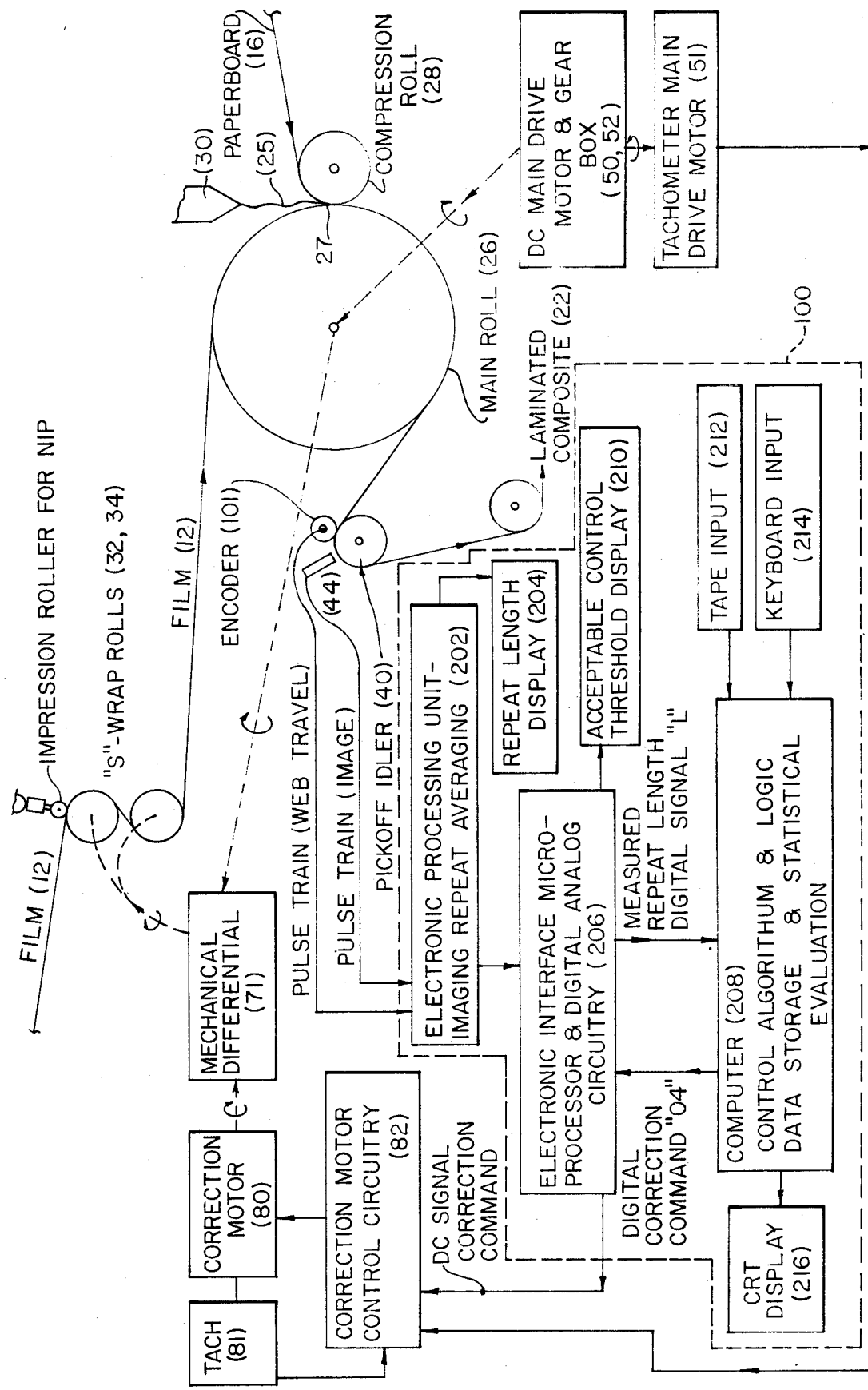
FIG. 2X is a schematic drawing showing the monitoring and control functions of the laminating device of the type shown in FIG. 1X.
Figure 3:
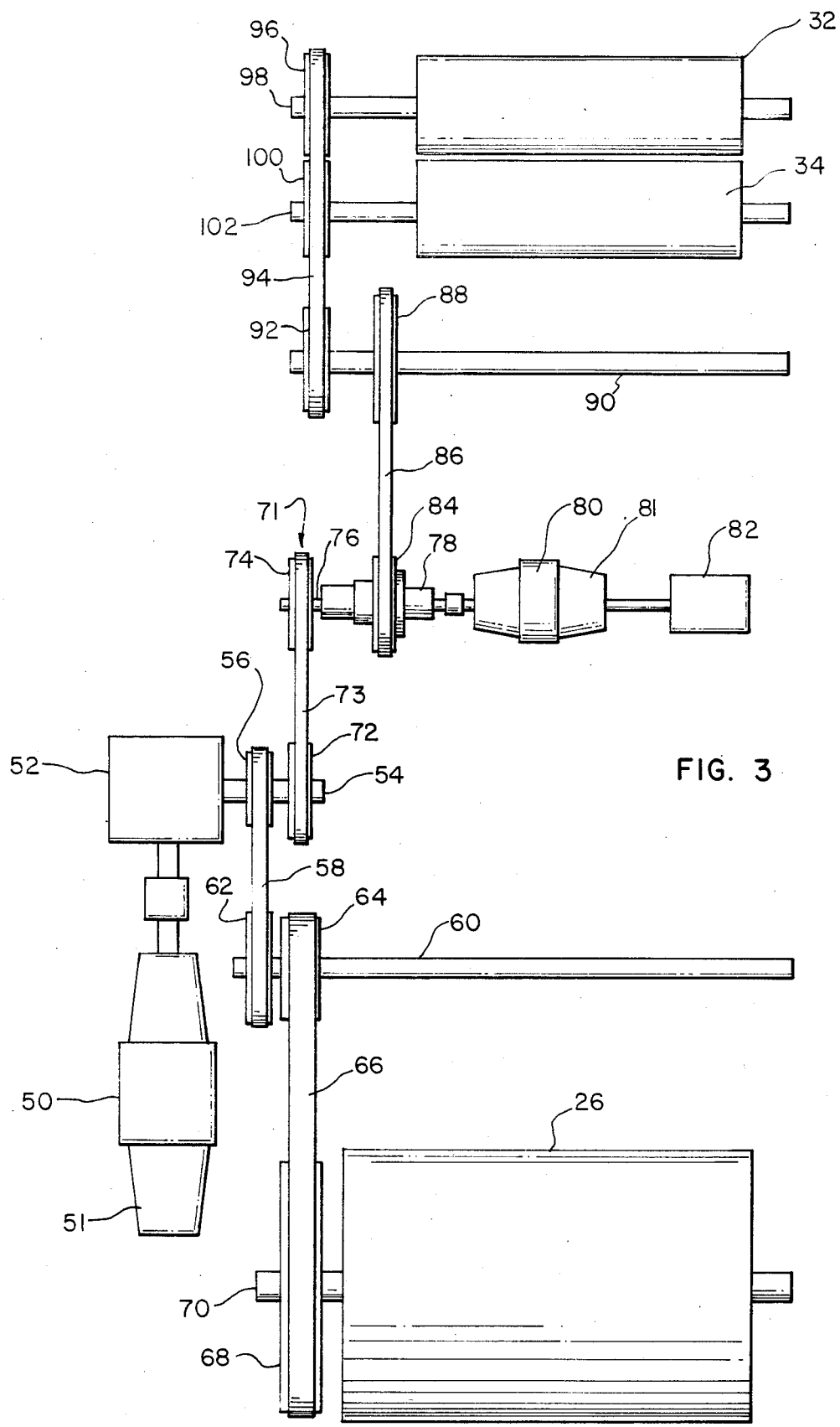
FIG. 3X is a schematic plan view showing major elements of a drive train of a laminating device of the type shown in FIG. 1X.

In general the laminating device 10 comprises structure and controls for continuously laminating a continuous relatively extensible film web 12 to a continuous relatively non-extensible paper web 16 to form a continuous web of laminated composite 22.

As illustrated schematically by FIG. 1X, the laminating device 10 of the present invention comprises a film supply means such as film spool 14 for supplying a web of extensible plastic film material 12 to be laminated with a web of paper material 16 provided from a paper supply means such as a paper spool 18. A composite collection means such as a composite take up spool 24 is provided for collecting the composite film/paper material after lamination. The film upon leaving the film spool 14 may pass through a film unwind dancer assembly 15 which may comprise a dancer arm 29 pivotally mounted at 31 to the machine frame. The dancer arm 29 is also pivotally attached to a pneumatic cylinder unit 33 having a preset internal pressure which is adjustable to accommodate different film web tensions which may be encountered in the use of different types of films or films of different thickness or width. A pair of longitudinally spaced apart dancer idler rolls 35 are mounted on dancer arm 29 and a second pair of idler rolls are mounted at the machine frame in a longitudinally and transversely spaced relationship with the dancer rolls 35. The film web 12 is wrapped back and forth between the two pairs of rolls 35, 37 as shown in FIG. 1X. Changes in the film web tension, as a result of film speed fluctuation produced either upstream or downstream of the dancer are rapidly dampened out by pivotal movement of the dancer arm 29 in response to the film speed differential. The constant pressure pneumatic cylinder co-acts with the dancer arm to maintain the film web at a preset tension associated with the pneumatic cylinder pressure. A potentiometer unit 39 is actuated by rotational movement of the dancer and generates a control signal which is used to control a film spool motor 41 and tachometer generator 42 to either increase or decrease the rate at which film web 12 is unwound from the spool. The film web is drawn from the spool 14 by draw rolls 32, 34 as discussed in further detail below. Thus the dancer assembly provides a means for correcting and maintaining the tension of the film web at a constant tension value in a first film web tension zone between the film spool 14 and the draw rolls 32, 34.

A film web tension monitor such as an idler roll and load cell transducer assembly 43 monitors the tension in the film web 12 in the first tension zone and generates a tension monitoring control signal in response thereto which is input to a computer means 100 for control purposes as explained in further detail hereinafter. The film 12 may pass over a number of cylindrical idler rolls 36 which may be used to straighten and flatten the film 12 as it leaves the spool 14 and which also function to properly align the film material 12 with a first motive means such as S-wrap rolls 32, 34. The motive means provides the motive force for drawing the film 12 from the film supply means and also cooperates with a second motive means in controlling the stretch in the film material, as described in further detail below. The first motive means may comprise various draw roll configurations such as pinch rolls, also referred to as nip rolls, and other types of draw rolls. In the embodiment illustrated in FIGS. 1-4 the first motive means comprise S-wrap rolls 32, 34. (In an alternate embodiment an idler pinch roll 47 having roll contacting force applied thereto by a pneumatic cylinder unit 49 may be used to augment the drawing action of rolls 32, 34 or in another embodiment may be substituted for roll 34.) The two equal radius cylindrical rolls 32, 34 are positioned in parallel axial alignment and rotate in opposite directions at the same speed. The surface of the rolls 32, 34 must be sufficiently smooth to avoid damaging the plastic film web 12 and yet must provide sufficient frictional contact with the film web 12 to prevent slipping between the film and roll surfaces. Thus the roll surface may be rubber or any number of other surfaces. The film web is wrapped in an S-shaped configuration over and around the upstream roll 32, then over and around the downstream roll 34, as illustrated in FIG. 1. This so called "S-wrap" configuration enhances the frictional contact between the film web 12 and rolls 32, 34 providing a nonslipping "nip effect" relationship wherein the rate of film advance upon leaving the rolls 32, 34 is equal to the tangential speed component at the surface of the rolls 32, 34. After leaving the first motive means the film web 12 passes over a second tension monitoring means into a second motive means which in the preferred embodiment also functions as a laminating means. The second motive means may comprise a laminating nip 27 such as formed by laminating rolls 26, 28. The film web positioned between the first film motive means and the second film motive means defines a second film tension zone.

In the preferred embodiment one or more idler rolls 38 may be used to position the film web 12 at a proper entry angle into the laminating nip 27. The film web 12 and paper web 16 are treated with an adhesive material such as for example a melted polymer plastic 25 (such as low density polyethelene having a melt index of approximately 8 and supplied at a temperature above 615° F. and preferably 620° F. to 630° F.) which is supplied by an adhesive supply source 30 which causes permanent bonding of the paper web 16 and plastic 12 as it passes through the laminating nip 27. The laminating rolls 26, 28 may comprise a main roll 26 which may have a diameter of 24 inches and which may contain cooling (or heating) elements to aid in the production of the adhesive bond between the paper and film. The main roll 26 is driven by a main drive means such as main drive motor 50 illustrated in FIG. 2X and discussed in further detail below. Compression roll 28 may also be driven by the same drive motor 50 or by a "tendency" drive unit (not shown) which overcomes any frictional resistance between the webs and rolls to prevent composite distortion, or may alternatively be driven solely by rolling contact with the main roll 26. Compression roll 26 in one embodiment is also a chill roll and has a rubber outer surface to prevent web slippage which is cooled by radially inwardly positioned roll cooling structure of a type well known in the art.

The laminating nip 27 formed by laminating rolls 26, 28 draws the film web 12 and paper web 16 therethrough and simultaneously compresses it to form laminated composite 22. In applications where hot adhesive is applied to the film and paper web at the laminating nip 27, it has been found that the amount of arcuate coverage of the main chill roll 26 by the film web 12 prior to entering the nip may be critical. If the film web enters the laminating nip 27 with very little rolling contact with roll 26, then tension variations in the film web in the second tension zone may cause discontinuous film stretch in the area near the laminating nip which would result in scrap and adversely effect the stretch control function of the machine.

On the other hand, if the arcuate amount of film coverage of roll 26 prior to entry of the film into nip 26 is too great, it has been found that air is drawn into the interface between film web 12 and the roller 26 surface causing discontinuities or "bubbles" to form in the web prior to entering nip 27 which effect the quality of the composite 22 which is formed at the nip 27. When low density polyethelene film having a melt index of approximately 2 is used with a 24 inch diameter chill roll 26 and where adhesive at a temperature of between 615° F. and 650° F. is applied to the laminating nip, it has been found that an angle of arcuate coverage "x" of between 35° and 65° is critical to operation of the laminating device 10.

Again, it should be noted that nonslipping contact between the moving surface of the second motive means and the film web 12 is essential to the operation of the invention. In the preferred embodiment this nonslipping contact is ensured by the relatively large surface area of the main roll 26 over which the film is wrapped as well as the compressive force exerted by the compression roll 28 at the laminating nip 27. As with the S-wrap rolls 32, 34, the surfaces of the compression roll 28 and main roll 26 must be sufficiently smooth to avoid damaging the film web 12 and paper web 16 and may comprise polished steel in the case of roll 26 and smooth rubber in the case of roll 28.

Nonslipping frictional contact between the main roll 26 and film ensures that the rate of film advance through the laminating nip will be equal to the tangential velocity component of the surface of the main roll 26. Thus the rate of film advance at the point the film leaves the S-wrap rolls 32, 34 and the rate of film advance at the laminating nip 27 is directly proportional to the rotational velocity of the S-wrap rolls 32, 34 and the rotational velocity of the main roll 26 respectively. By changing the rotational velocity of the S-wrap rolls 32, 34 with respect to the rotational velocity of the main roll 26 a speed differential is created in the film web between the point 35 where the film leaves the S-wrap rolls 32, 34 and the point that it enters the laminating nip 27, i.e., in the second film tension zone. By increasing the rotational speed of the S-wrap rolls 32, 34 with respect to the main roll 26 so that the tangential velocity component at the surface of the S-wrap rolls 32, 34 exceeds the tangential velocity component at the surface of the main roll 26, the film web therebetween is caused to relax. By decreasing the relative speed of the S-wrap rolls 32, 34 with respect to the main roll 26 the film is caused to stretch. The amount of stretch or relaxation in the film is dependent on the amount of difference between the surface speeds of the S-wrap rolls 32, 34 and main roll 26.

The paper web 16 is drawn from a paper supply spool 18 by the laminating rollers 26, 28. In the embodiment illustrated in FIG. 1X the paper web is passed through a paper web dancer assembly 150 comprising a dancer arm 152 pivotally attached at 153 to fixed frame structure and having a single dancer idler roll 154 mounted thereon for receiving the paper web 16 thereabout. The dancer arm 152 is pinned to a constant pressure pneumatic cylinder 156 which functions in the same manner as film dancer cylinder 33 to provide a constant web tension. Upon leaving the dancer assembly the paper web passes over a series of idler rollers 160 and thereafter around a paper tension monitor 162 which provides a paper web tension indicating signal to the computer 100, or alternately, directly to control circuitry for controlling a drag brake 164 to vary the speed of the paper unwind to cooperate with the dancer assembly 150 to maintain the paper web of a constant tension value. Alternately the paper dancer assembly 150 could be provided with a potentiometer of the same type used with the film dancer assembly 5 to drag brake 164 to adjust the paper spool angular velocity. Upon leaving the laminating nip 27, composite 22 may pass over another series of idler rolls 40 and a composite tension monitor 53 and is thereafter received by a collection means such as composite take up roll 24 driven by a wind up motor 29 which changes speed in response to a signal generated by tension monitor 53 to maintain a preset tension in the composite web 22. Alternatively the composite 22 may be further processed as by cutting and folding devices (not shown) to form a final or more completed product.

The relative stretch in selected portions of the film web 12 subsequent to its lamination with the paper web 16 is measured by a monitoring means. In the preferred embodiment the film web 12 is provided with photoelectricly readable preprinted marks 19 positioned at equally spaced points near one edge of the film 12 as shown by FIG. 4X. The distance between these marks 19 will be referred to hereinafter as the "repeat length". As previously mentioned, the laminating device is designed to stretch or relax the film 12 in order to laminate a predetermined portion of the film 12 to the paper backing material 16. The distance between the marks in this ideal or design condition will be referred to as the "design repeat length". However, during operation of the laminating device 10, the film web 12 will stretch and relax and thus the distance between marks may deviate from the "design repeat length" until the system corrects itself, as discussed hereinafter. The actual distance measured between marks 19 by the monitoring means, described hereinafter, will be referred to as the "actual repeat length".

The monitoring means provides data to a data processing means from which the amount of stretch or relaxation in the film may be computed. The data processing means provides a control signal to a first motive means speed control means responsive to the monitoring means data to selectively vary the speed of the first motive means with respect to the second motive means for imparting a predetermined amount of stretch or relaxation to the film as it passes between the first and second motive means.

In the illustrative embodiments the monitoring means comprise photoelectric sensing means, such as photoelectric unit 44, positioned at some point near the path of the composite web 22 downstream from laminating nip 27 for detecting the preprinted spaced apart marks 19 on the film 12 edge. The photoelectric unit operates in a conventional manner by sending out an electronic pulse signal in response to a disturbance in a beam of light (not shown) provided by the unit. In this use of the photoelectric unit with the present invention the disturbance in the light beam is produced by the passage therethrough of a preprinted mark 19. The photoelectric unit 44 might be any of a number of commercially available high speed units such as MEI Services Inc.'s Scan-A-Matic Model PLM-2000.

Figure 4:
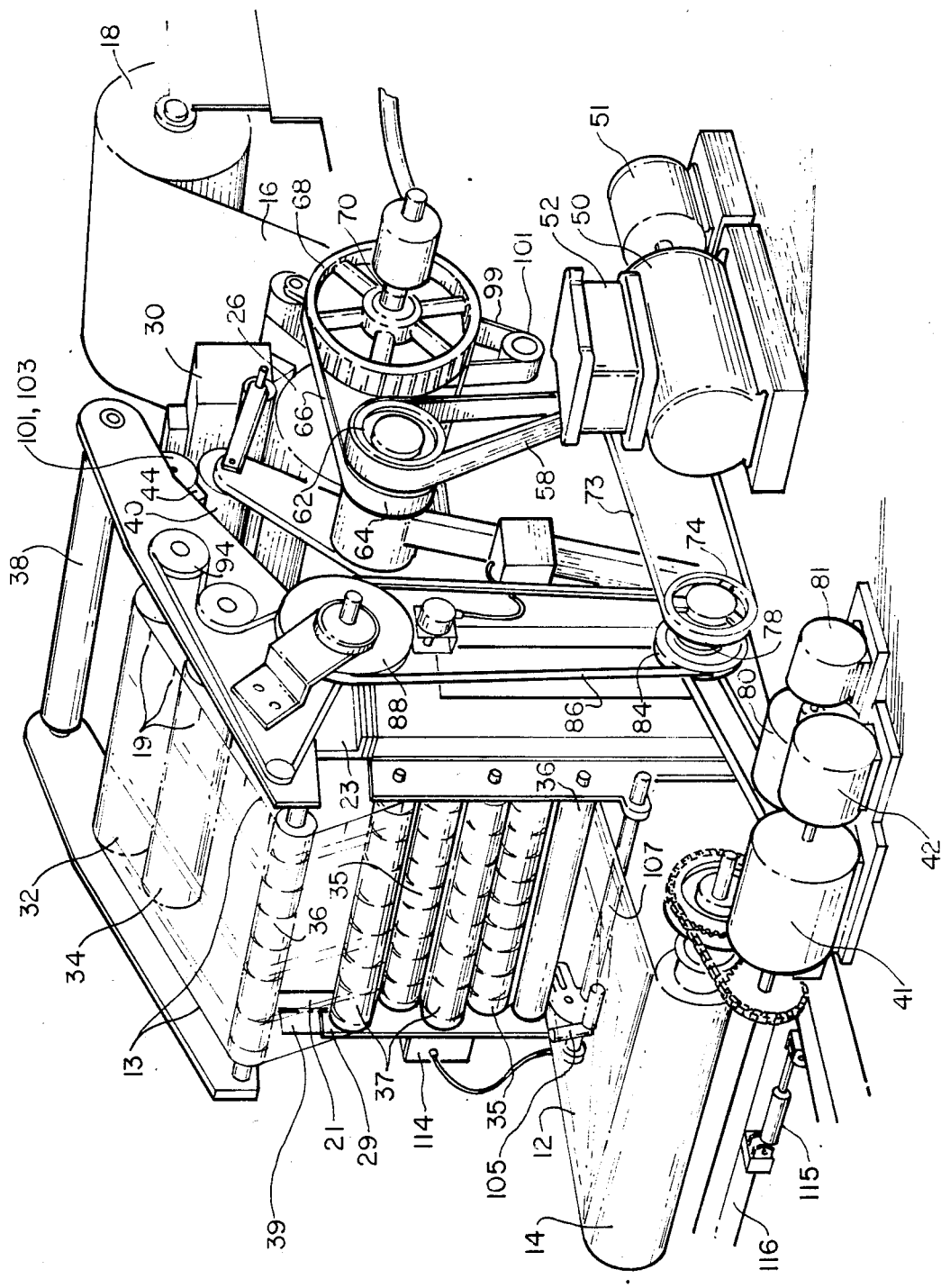
FIG. 4X is a perspective view of a laminating device of the type shown in FIG. 1X.

In a preferred embodiment as illustrated schematically by FIG. 2X the photoelectric unit 44 provides a single electronic pulse signal to the data processing means, which may be an electronic data processing unit 100, each time a printed mark is detected. As further illustrated by FIG. 3X, a continuous electronic pulse train is also provided as input to the data processing unit 100 by an electronic encoder unit 101. The electronic encoder may be rotatably connected, as by a drive belt 99 (FIG. 4) or other conventional means, to one of the drive shafts in the main roll 26 drive system or as illustrated by FIG. 1 and 4 may comprise a roller portion 103 of a predetermined diameter which contacts and is rotated by the composite web 22, described in further detail hereinafter. The electronic encoder 101 emits a fixed number of pulses per revolution of the roller portion 103 or the associated drive system shaft typically on the order of 3,000–6,000. Thus the pulse train receives its master speed reference from the main roll drive system providing a time base for computer operations described below. The rotary pulser may be of a commercially available type such as the Baldwin 5V278 Optical Incremental Encoder. However, in a preferred embodiment of the invention it was found that a significant improvement in film monitoring and system response was provided by providing a higher revolution encoder, preferably 6,000 pulses per revolution in combination with an encoder roller 103 having a circumference of about one foot whereby a web monitoring revolution of 0.002 inches of web per encoder pulse is provided. It has been found that, if web monitoring revolutions substantially below this value are used and especially if the value is below 0.010 inches per pulse, the stretch control function of the laminating device 10 deteriorated significantly. It has also been found that if a lower revolution encoder pulse emitter is used with a smaller roller portion 103, e.g., a six inch circumference, the higher speed rotation of the smaller wheel may introduce errors, especially at higher web speed, e.g., 800 to 1,000 feet per minute. It has also been found that if too large a roller portion 103 is provided to reduce the pulse frequency output by the encoder, that roller angular inertial may introduce errors to the system. Thus it has been found that an encoder pulse frequency of between 5,000 and 10,000 pulses per revolution used in combination with a roller of between 4 inches and 8 inches in diameter provides the best system monitoring revolutions for web speeds on the order of 600 to 1,000 feet per minute.

Figure 5:
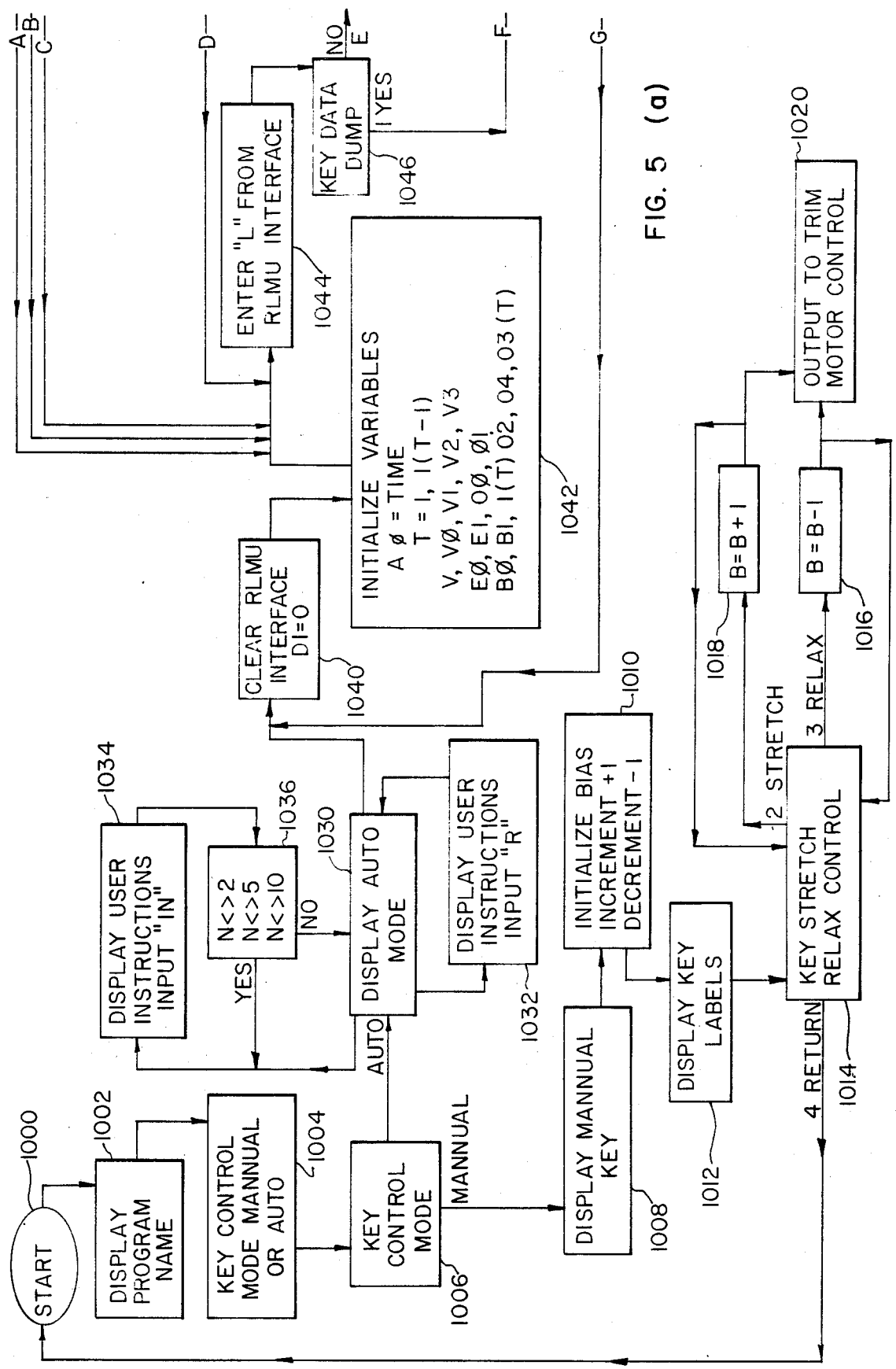
FIG. 5X, including portions 5X(a), 5X(b) and 5X(c), is a program flow chart of computer software for controlling film stretch in a laminator. Flow lines at the edge of each sheet have been lettered with the identical letters of connecting lines on adjacent sheets for ease of reference between adjacent sheets.
Figure 5:
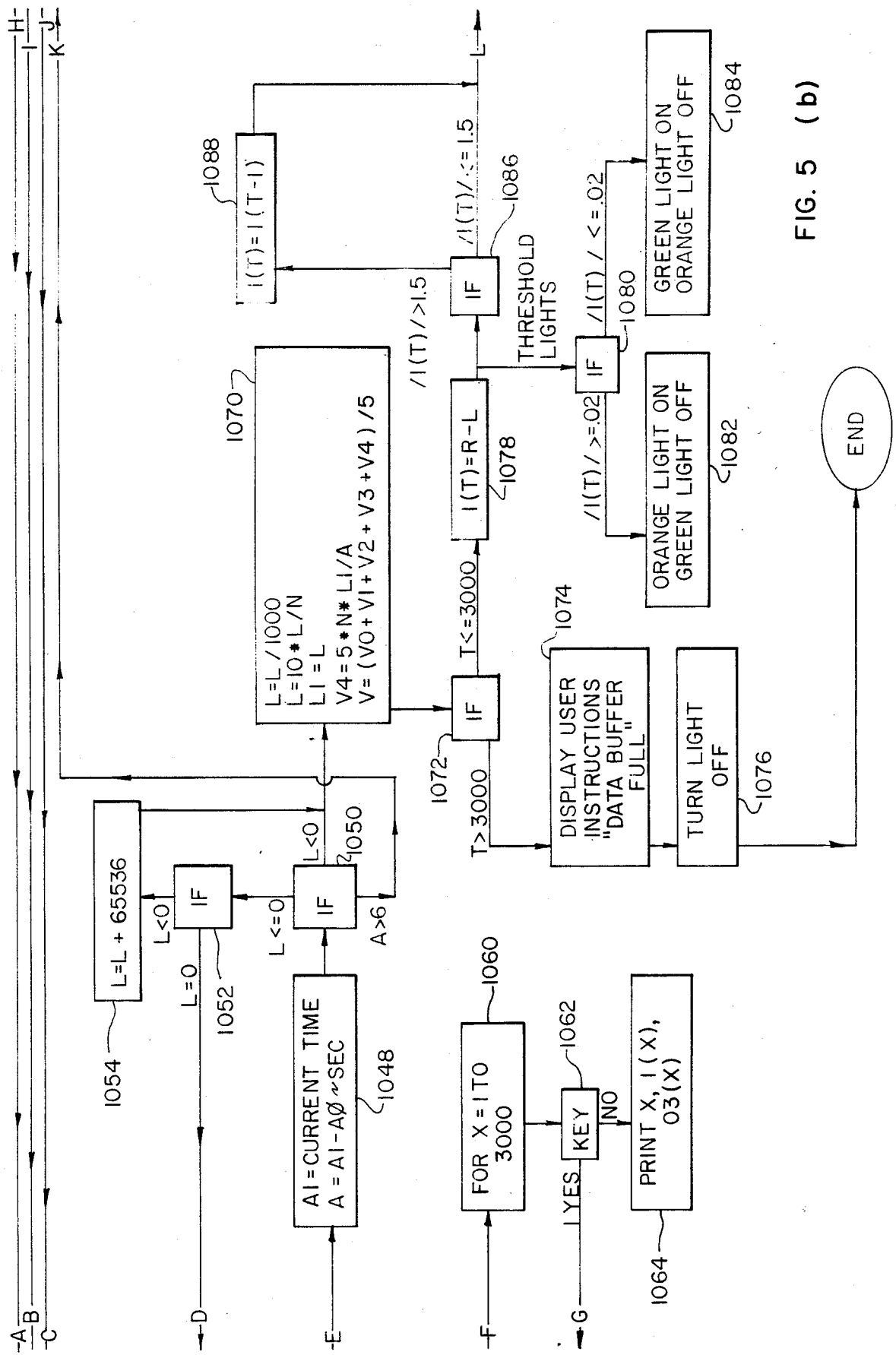
Figure 5:
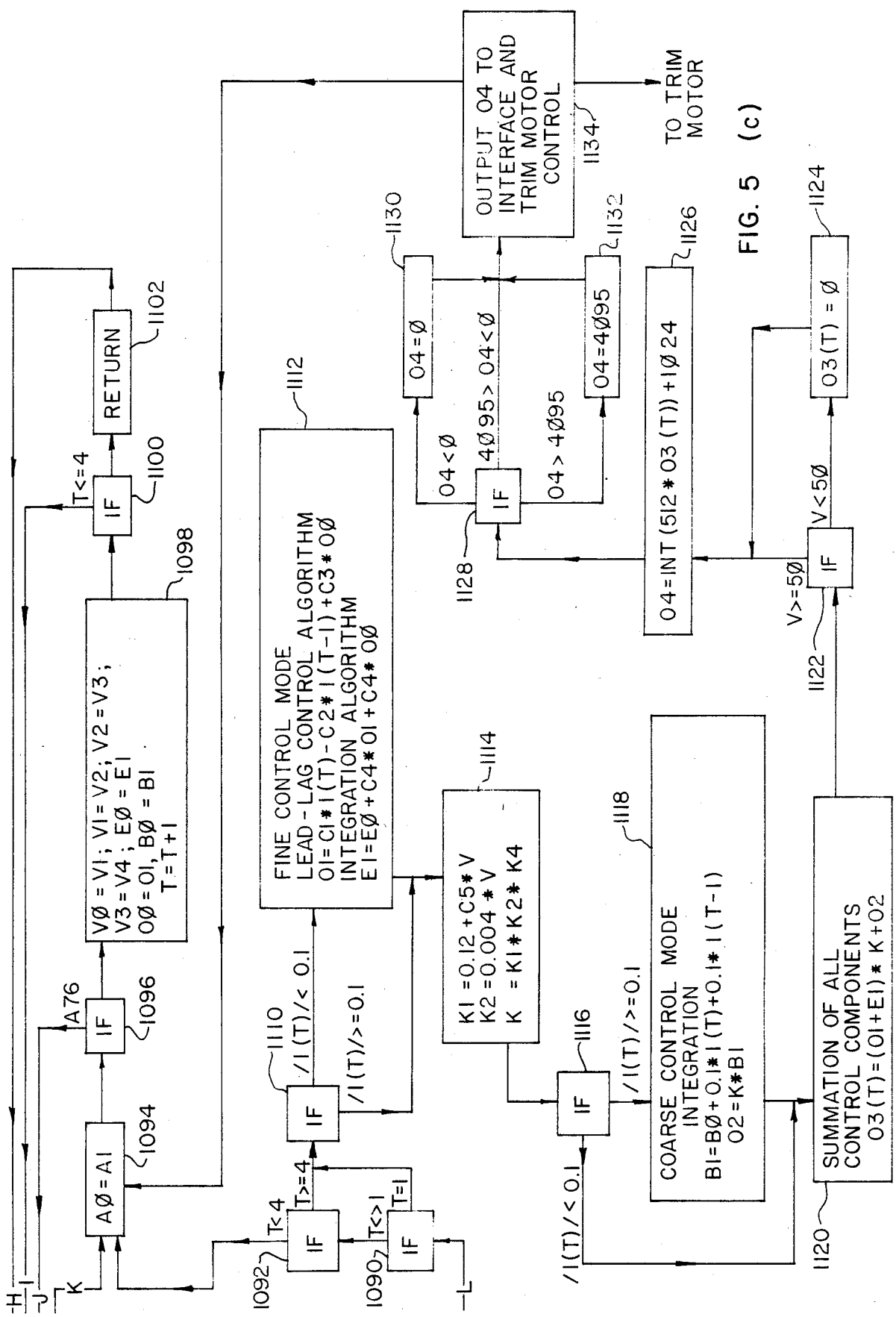
Figure 6:
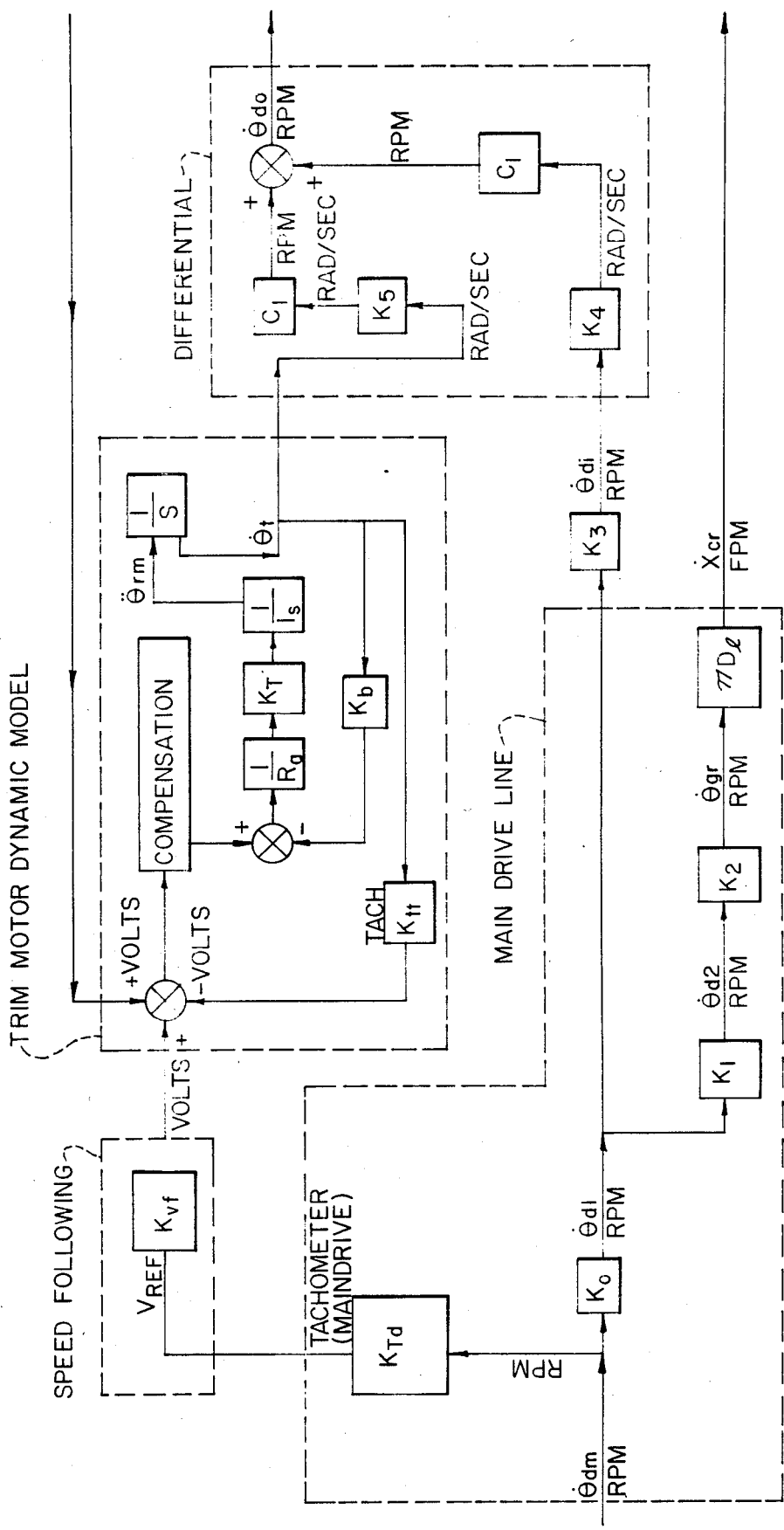
FIG. 6X, including portions 6X(a), 6X(b) and 6X(c), is a flow chart showing the interaction of various system components with the computer software of FIG. 5X to perform film web stretch control.
Figure 6:
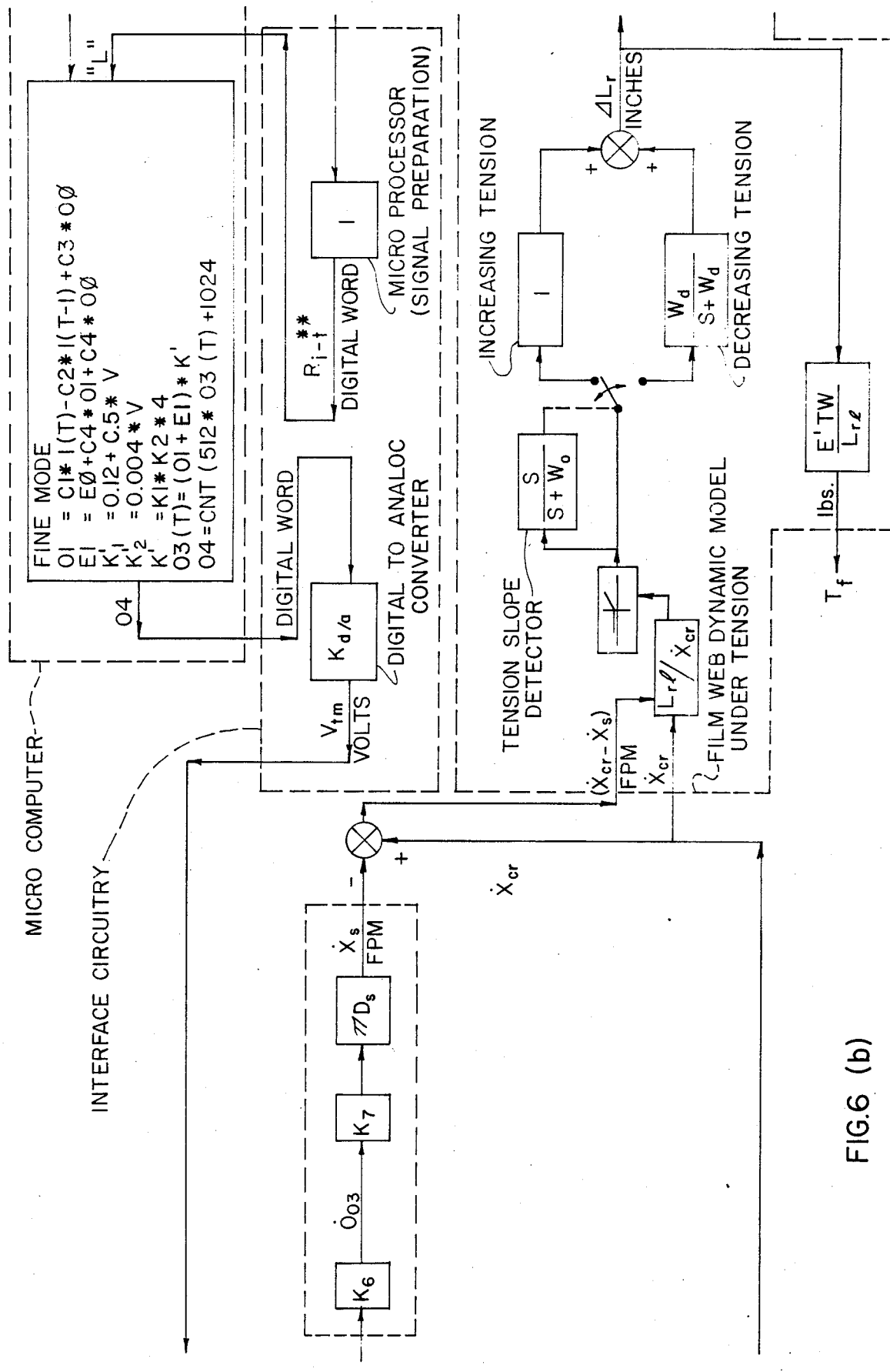
Figure 6:
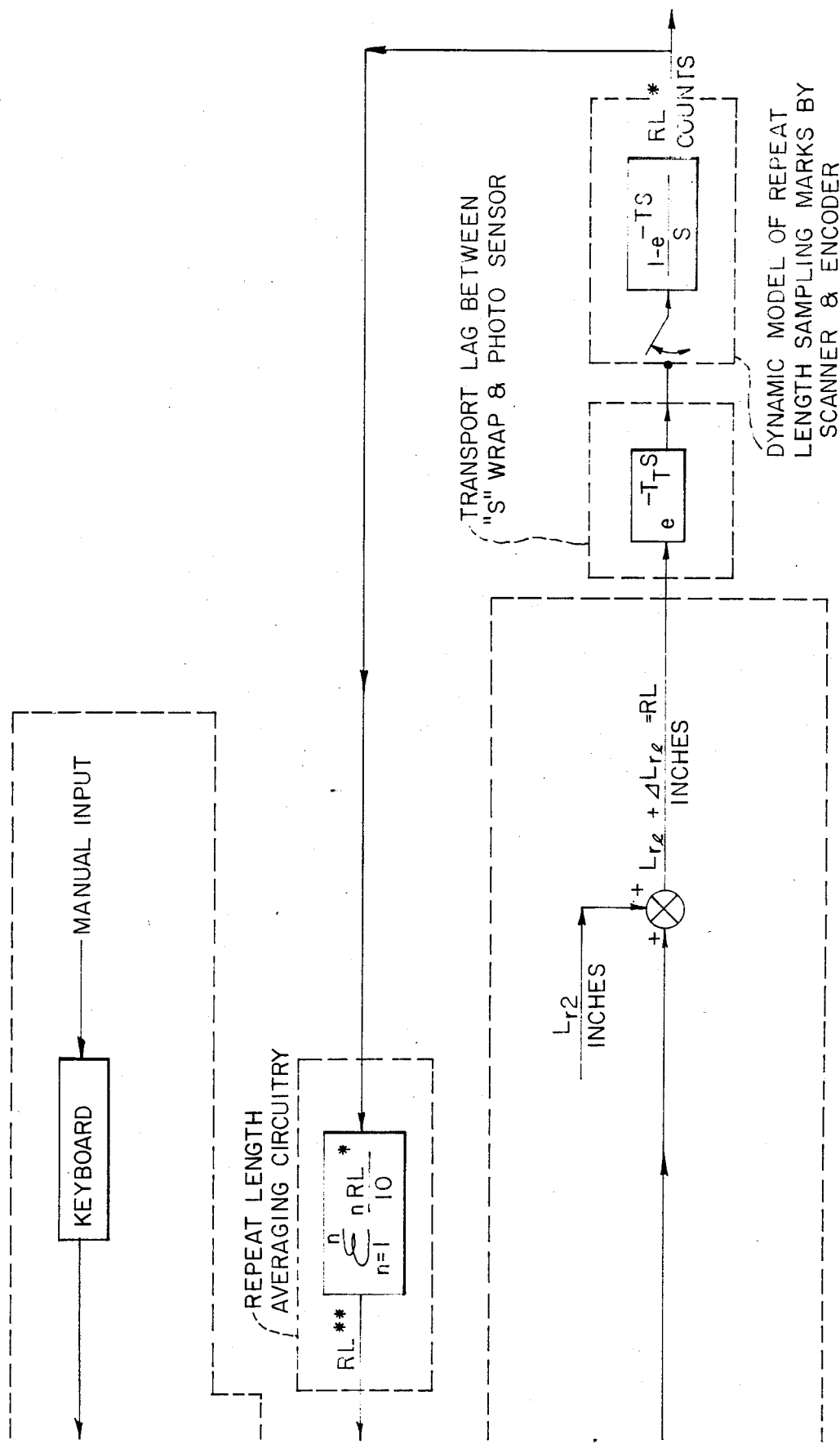

The data processing unit 100 is programmed by a convention circuitry well known in the art to count the number of pulses input from the rotary pulser 101 between consecutive pulses detected by photoelectric unit 44. In slightly different language, the signal from the photoelectric unit initializes a "count window" which is loaded with digital data. The data is loaded into memory at the detection of the next mark and a new count window is simultaneously initialized for the next data loading. Details of these computer operations are discussed below with reference to FIGS. 5 and 6.

The digital data from each count window is processed to determine the actual repeat length of the film passing the photoelectric unit 44 and the result is compared by means of conventional comparator circuitry well known in the art to a value representing the design repeat length which is stored in memory. Electronic correction commands are generated based on the deviation between the actual and design repeat lengths and provided as input to correction motor control circuitry 80.

Operator input from a conventional input terminal 102 of a type well known in the art provides processing information such as the design repeat length and the amount of deviation of the actual repeat length from the design repeat length required to initiate correction commands as well as the number of count window repeats required to initiate correction commands.

The electronic correction commands provided to the control circuitry 82 are converted thereby to analog output which is supplied to the direct current "trim" or correction motor 80 mechanically linked to a phase drive unit 71. A conventional motor speed monitoring means such as a tachometer generator 81 is operably connected to the correction motor drive shaft and outputs a tach signal which is provided to the correction motor control circuitry 82.

The mechanical output of the phase drive unit 71 is drivingly linked to the S-wrap rolls 32, 34, discussed in further detail hereinafter and the rotational speed of the rolls 32, 34 is thus controlled with respect to the main roll 26 rotational speed by mechanical input from the correction motor 80.

Thus by calculating the actual repeat length of the laminated composite 22 with information supplied by the rotary pulser 101 and photoelectric unit 44 and comparing the result to the design repeat length, the processing unit 100 controls the speed of the S-wrap rolls 32, 34 through appropriate control circuitry and a phase drive system to control the stretch or relaxation of the film 12.

As indicated by phantom lines in FIG. 1 the method of monitoring the film repeat length may be varied slightly by using two photoelectric assemblies 45, 47 positioned at a spaced apart distance equal to the design repeat length of the film. In this embodiment a count window is initialized by a mark detection pulse from one photoelectric detector and terminated by a mark detection pulse from the other photoelectric detector. If the actual repeat length is equal to the design repeat length consecutive spaced apart preprinted marks 19 pass the detectors 45, 47 simultaneously leaving no time gap between the pulse signals generated thereby. Thus no pulse train digital data enters the count window. However, any deviation of the actual repeat length from the design repeat length will cause the marks 19 to pass the detectors 45, 47 at different times producing a time differential between the pulse signals produced by the detectors 45, 47. The time differential between signals allows pulse train data to be loaded into the count window, the number of pulse train pulses in the window indicating the amount of error in length. Thus in this embodiment no operator input to the processor 100 is required to indicate the design repeat length but the photoelectric devices 45 and 47 must be physically positioned at a distance equal to the design repeat length or some multiple thereof.

Third type of repeat length sensor (not shown) uses three optical scanners. Two of the scanners are separated by a short fixed distance on-line in the machine direction of the web. The third optical scanner is placed on-line also, but separated from the farthest optical sensor by the desired repeat length. The first two scanners measure the velocity of the web by measuring time over a fixed distance of web travel. The time is also measured between pulses of the two scanners spaced farthest apart. From these two bits of information the repeat length error can be calculated in an associated electronic processor.

The processing unit 100 may also be provided with a display 110 for displaying various information such as actual repeat length, repeat length error, time response data, etc. depending upon the programming software used.

The mechanical linkage of the laminating device is illustrated in FIG. 3X. A main drive means such as main drive motor 50 with tachometer generator unit 51, FIG. 4X, is operably connected to a main gear box 52 which in turn drives main drive shaft 54. Main drive shaft pulley 56 mounted on shaft 54 is connected by means of drive belt 58 to a secondary drive shaft pulley 62 coaxially mounted on secondary drive shaft 60 with pulley 64. Pulley 64 is operably connected to main roll pulley 68 by another belt 66 whereby the main roll 26 is rotated about main roll drive shaft 70. S-wrap rolls 32, 34 are mechanically linked to phase drive unit 71 and main drive motor 50 as by main drive shaft parasite pulley 72 operably connected by belt 73 to phase drive pulley 74, in turn mounted on phase drive shaft 76. Phase drive shaft 76 is operably connected by conventional means well known in the art to a differential unit 78, such as for example a Conac 25 Differential Unit, having a phase drive correction pulley 84. Phase drive correction pulley 84 is operably connected by means of a drive belt 86 to conversion pulley 88 mounted on conversion drive shaft 90 upon which S-wrap connector pulley 92 is coaxially mounted. S-wrap roll belt 94 is operably connected to upper S-wrap roll pulley 96 and lower S-wrap roll pulley 100 in an S-wrap configuration (FIG. 4) whereby first and second S-wrap shafts 98, 102 and consequently S-wrap rolls 32, 34 are rotated in opposite directions at the same speed.

Mechanical input to differential unit 78 is provided by correction motor 80 for the purpose of increasing or decreasing the rotation speed of phase drive correction pulley 84. The correction motor rotational input is added or subtracted from the speed of shaft 76 by an internal differential gearing mechanism (not shown) of a type well known in the mechanical arts. Correction motor 80 is actuated and controlled by correction motor control circuitry unit 82 which in turn receives commands from processing unit 100 as discussed in further detail herein.

The control components of the system will now be described in further detail with reference to Table A and FIGS. 2X, 5X, and 6X.

The basic laminator control system components of one preferred embodiment of the invention is illustrated in FIG. 2X. The web speed indicating pulse train from encoder 101 and the film mark sensing pulse train from photoelectric unit 44 are supplied to an electronic processing unit 202 which computes and averages repeat lengths from information provided by the two pulse trains. The repeat length may be displayed on a conventional CRT unit or LED digital display at 204. The averaged repeat length values from unit 202 are also provided to electronic microprocessor and digital to analog circuitry which transmits digital data corresponding to the measured repeat length to a microcomputer 208. The electronic interface circuitry also provides a signal to a LED display which provides an acceptable control threshhold display 210. The microcomputer 208 which contains the control algorithm and logic and which provides data storage and statistical evaluation of the system receives its operating instructions by conventional input devices, such as tape input unit 212 and keyboard input unit 214. A CRT display 216 for displaying various system information and for presenting information requests to the operator. The computer 208 processes the digital repeat length data from interface circuitry 206 and outputs a digital correction command to the interface circuitry which converts the digital command to an analogue voltage command which is provided to the correction motor control circuitry 82. A main drive reference speed signal is provided from the main drive motor tachometer unit 51 to the correction motor control circuitry 82, and a feed back reference speed signal from the correction motor 80 is also provided to the correction motor central circuitry. The correction motor central circuitry processes these reference signals and correction signal and provides a proper signal to the correction motor to increase, decrease, or maintain its present speed as may be required. As explained above, the correction motor mechanical output to mechanical differential unit 71 influences the speed of the S-wrap rolls 32, 34 or other draw roll means to stretch or relax the film web 12 passing through the second tension zone.

A computer program is used to implement the control logic and algorithms arrived at in the stability analysis discussed in another section. That program listing is attached as Appendix A and the symbols used to define process variables are listed in the table of symbol definition, Table A. The program flow chart is shown in FIG. 5X. The program allows both manual and automatic modes of control. In the manual mode, the operator can increment or decrement (stretch or relax respectively) the film web repeat length. The operator has the measured repeat lengths displayed for aiding his adjustments. In the automatic mode the computer derives, by way of digital filtering and correction of error magnitude, the signal sent to the DC correction motor 80 for alteration of web stretch. The automatic mode of control has a coarse and fine mode of operation. The coarse mode is used to acquire the repeat length by stretching the web to the correct length within one tenth of an inch. The fine mode of control is then employed to bring the repeat length to within 0.015 (1/64th) inch of the correct value.

The program is also written to store the averaged measured repeat length variations. These values can then be printed out to provide a time history of control performance for each roll of material laminated. A statistical evaluation is another method available for production evaluation.

The flow sheet of FIG. 5X provides a visual summary of the computer program signal computations and the sequence of those computations. These operations may be summarized as follows:

1. The operator selects the mode of control—automatic or manual.

2. In the manual mode stretch control is performed by operator input at a terminal keyboard.

3. In the automatic control mode the operator must input the desired image repeat length in inches and also the number of repeats being averaged in the repeat length measurement circuit.

4. The input sample of repeat length error is checked to determine if the error is realistic, absolute value greater than 1.5 inches, if it is greater than 1.5 inches. The old or previous value of error is used.

5. In order to initialize the running averages with actual numbers, the computations and therefore the control loop is passed through six times before any commands are sent to the control motor.

6. If the web speed is less than 50 fpm, no control is attempted.

7. If the absolute value of repeat length error is greater than one-tenth of an inch, the control stays in a coarse mode of operation; if the error is less than one-tenth inch, the control is placed in a fine mode of operation.

8. If the repeat length measured and sent to the computer is negative, an obviously erroneous number, the computer uses the number's positive absolute value to avoid erroneous computer response.

9. A test is also made to ensure that the command signal sent to the digital to analog conversion unit is within acceptable limits for that component.

10. A pair of control panel threshhold lights: one orange, one green, are switched on or off depending upon the absolute value of the repeat length error. If the error is greater than 0.020 inches, the orange light is switched on and the green light is switched off. If the error is less than 0.020 inches, the green light is switched on and the orange light is switched off. However, if more than 3000 samples of the averaged repeats have been stored in computer memory, the memory buffer is full and both lights are switched off indicating the repeat length control is no longer operative and that the buffer should be dumped to restart control.

More specifically the sequence of operations in FIG. 5X is as follows: first as indicated at blocks 1000 and 1002, a display of the program is provided. Initially the name of the program is displayed. Next the operator is asked to decide whether he wants the laminator control to be manual or entirely automatic through the computer, block 1004. The operator elects whether "manual" or "automatic" through the key control mode at 1006. If the manual mode is chosen, the computer display screen indicates whether the voltage to the control motor is to be incremented or decremented (increased or decreased) at block 1008. At block 1010 the operator is given the option of initializing the bias for the amount of the increment or decrement. Block 1012 shows that the computer display terminal will indicate which key is to be used by the operator to increment or decrement the voltage to the control motor. In block 1014, it is illustrated that the indicated key can be struck by the operator to incrementally increase or decrease the amount of film stretch or relaxation. Block 1018 shows that then increment can be added to the bias by the method of block 1014, and block indicates that a decrement can be added to the bias by the method of block 1014. Block 1020 indicates that the bias and increment or decrement that are keyed in are transmitted to the control motor control circuitry to cause the control motor it to increase or decrease in speed to provide the indicated amount of film stretch or relaxation.

The manual control mode is used primarily in the case when the automatic control mode is for some reason inoperative. The automatic control mode which is used during most normal operating conditions begins at block 1006 through the proper key selection. After selecting the automatic mode, a number of questions must be presented to and answered by the operator. Thus, a question or questions are presented on the display screen, block 1030. Block 1032 indicates, the operator inputs the appropriate instructions to the computer. Thereafter another question is asked at block 1030 and the appropriate user instructions are input at block 1034. This input at block 1034, as illustrated by block 1036, is of the number of measured repeat lengths that must be averaged to arrive at a repeat length value that is used by the computer. In a preferred embodiment, the three possible selections for the number of repeat lengths are 2, 5 or 10. The yes/no lines extending from box 1036 indicates that the appropriate number 2, 5 or 10 must be selected or the question is again repeated. Next, at block 1040, the computer sets the repeat length measuring unit value D1 equal to "0" to clear the program of old data. In block 1042, variables in the control are initialized. The first value that is initialized is the present time (year, month, hours, minutes, seconds, etc.) which is given the symbol $A_0$. The next variable that is initialized is the symbol "T" which stands for the number of passes through the computer. T is initially assigned the value of "1" and is up-graded by an increment of 1 with each successive pass through the computer. Next, velocity terms—V, $V_0$, $V_1$, $V_2$, and $V_3$ are initialized. $V_0$ is equated to the velocity in the present pass through the loop. $V_1$ to the velocity in the prior pass; $V_2$ to the pass before $V_1$; and $V_3$ to the pass before $V_2$. All of these values are averaged to arrive at the value V which is used in the control gain. The remaining terms which are present in the control algorithm are all initially set to 0. Next, at block 1044, the computer looks for a pulse value (i.e., the number of encoder pulses between photoelectric cell pulses) arriving from of the repeat length measuring unit (RLMU). This value is symbolized with the letter "L". Next, the operator is given the option of printing out data at block 1046 for the purpose of obtaining a print-out of the repeat measure length values presently stored in computer memory. This option is exercised by striking a function key on the input terminal. Blocks 1060, 1062 and 1064 indicate print out instructions to the computer allowing the stored repeat length values to be printed. Block 1048 indicates that the computer computes the increments in time between successive passes. Blocks 1050 and 1052 indicate that the computer will interrogate the interface box 1044 until receiving a repeat length value greater than 0. Block 1054 prevents addition of an obviously erroneous negative number to the interface box. The path coming out of block 1050 which is followed when A is greater than 6 is used to initialize the values from block 1042 in situations where the web is running extremely slowly or is stopped. This operation is performed through blocks 1094 through 1102. If the value of L leaving block 1050 is a reasonable number greater than 0, the number is next processed in block 1070 to convert a pulse number into an engineering value in conventional units such as inches. In the same block 1070, the current composite web velocity is calculated and a velocity average over the past five passes is also calculated. Next, as indicated at block 1072, if the computer has made more than 3000 passes, the display indicates the storage buffer is full at block 1074 and at block 1076 a light is turned off at the interface panel to alert the operator to this control stopping condition.

At block 1072, if the number of passes through the computer is less than 3000, then redefinition of the error variable I (T) in block 1078 is provided which gives the repeat length error by subtracting the actual measured repeat length from the desired repeat length. At block 1080, if the value of the repeat length error is greater than 0.020 inches, an orange light is switched on on the display panel and a green light is switched off, as indicated at block 1082. If the value of the repeat length error is less than 0.020 inches, a green light is switched on and an orange light remains off as shown at block 1084. This function in blocks 1080 through 1084 is a display to the operator which indicates the quality of control on the repeat length. At block 1086 and 1088, if the value of the repeat length error is less than 1.5 inches, the information is transferred through the control loop. However, if the absolute value of this error function is greater than 1.5 inches, then the previous absolute value of error is substituted for the current value of error and this information is transmitted on through the control loop. The purpose of blocks 1086 and 1088 is to remove obviously incorrect values from the control system. Such situations might arise, for example, when a scanner misses a mark. Blocks 1090 through 1102 are used to initialize the smoothing functions in the control loop which, in the present control scheme, consist entirely of velocity terms. At block 1110, a determination is made as to whether to remain in a course control mode path or to follow a fine control mode path. The test is made based on the absolute value of the repeat length error. If that value is less than 1/10th of an inch, the fine control mode is followed. If the value is greater than 1/10th of an inch, then the system remains in the coarse control mode. If the fine control mode is selected, then the value is processed by a lead-lag control algorithm and integration algorithm and is thereafter input to block 1114. In block 1114, gain terms are computed which are thereafter input to block 1116. As indicated by the equations in block 1114, the gain values will be influenced by the web velocity. In the normal course of operation, in the coarse mode, the information will pass from block 1110 to block 1114, and thereafter through block 1116 to block 1118, where coarse mode control values are calculated. These values are transmitted to the control motor circuitry, as indicated by blocks 1120, which causes reduction the repeat length error and which after several iterations, causes sufficient reduction in the error value to cause the fine control mode path, from block 1110 through block 1112, 1114 and 1116 bypassing block 1118 and on to block 1120, to be followed. Blocks 1122 through blocks 1132 convert correction values to integer values which are output at block 1134 to the control motor control. As shown at block 1122, if the composite web velocity is less than 50 feet per minute, no control takes place.

A preferred embodiment of this operation of various system components (shown generally in FIG. 2X), which interface and/or co-act with the computer 208 to provide the stretch control of the present invention is shown in FIG. 6X. Symbols used in FIG. 6X are defined in Table A. The operations shown by FIG. 6X are self-explanatory to those of ordinary skill in the art.

A typical production unit embodying the above described features of the invention is illustrated in FIG. 4X. The production unit may have support means such as vertical support blocks 21, 23 wherein the various rolls and other system components are journeled or otherwise operably mounted. FIG. 4X also illustrates additional apparatus for monitoring and controlling the lateral position of the film web 12. A photo electric sensing device 105 of a conventional type is mounted at a predetermined position on transverse rod 107 immediately above the lateral edge of film web 12. The photoelectric sensing device 105 sends edge location information to a control box 114 having conventional circuitry for actuating a power means such as hydraulic cylinder 115 to move the film roll 14 laterally, as on sliding base 116 whereby the film edge is maintained in proper position for entry into laminating device 10.

Figure 7:
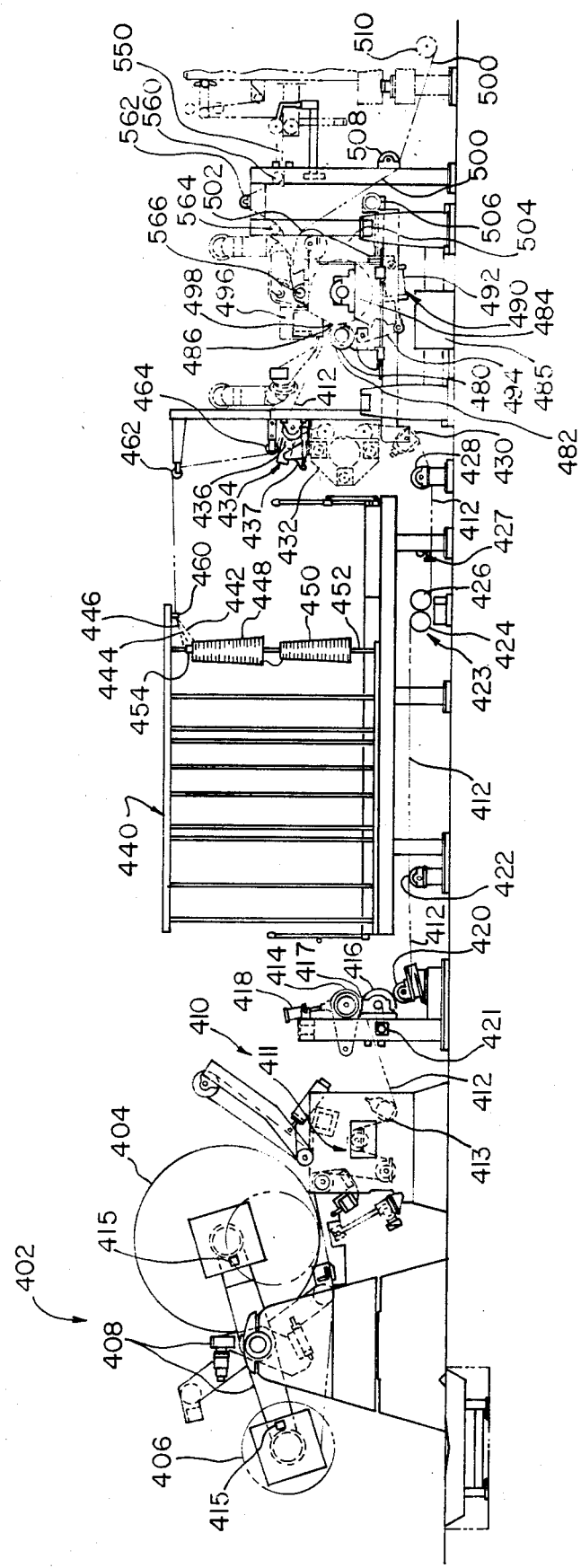
FIG. 7X and FIG. 8X illustrate adjacent portions of another embodiment of a laminating device.
Figure 8:
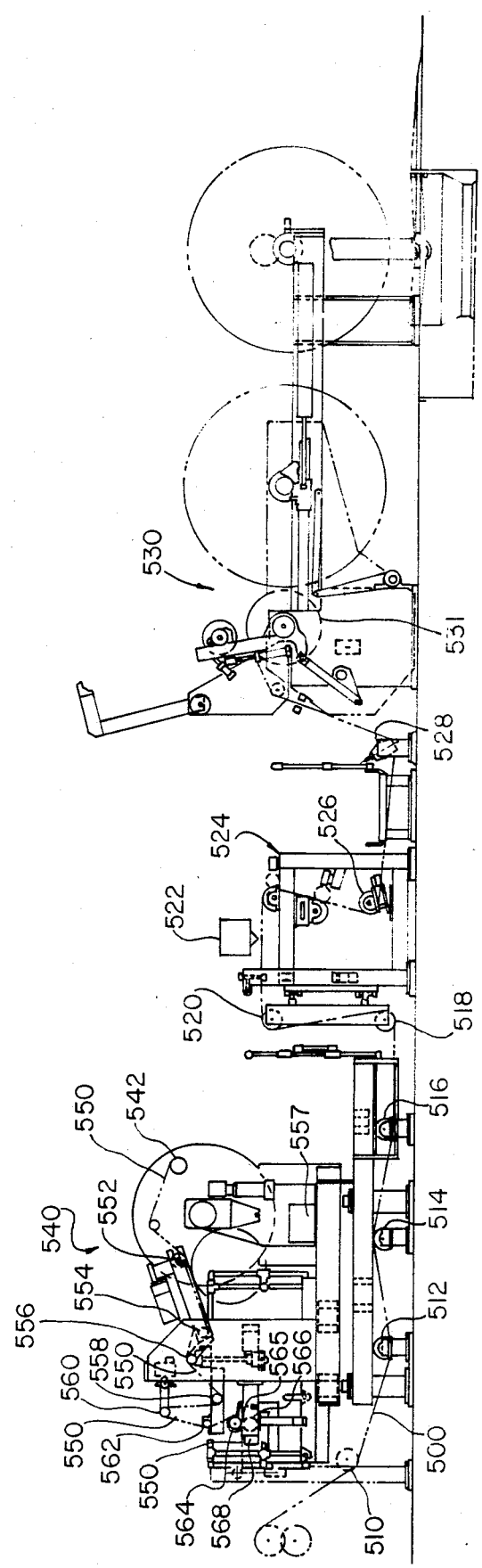

Another embodiment of the laminator device 10 of the present invention is illustrated in FIGS. 7x and 8x. In this embodiment the laminator 10 comprises a paper unwind station 402 having two paper rolls 404, 406 mounted on opposite ends of a pivotable yoke assembly 408. The unwind station provides continuous paper feed by means of prior art butt splice forming apparatus 410 operably associated with yoke assembly 408 as is well known in the art. After leaving the paper unwind station 402 and butt splice apparatus 410, the paper web 412 passes through a dancer assembly 411 of conventional construction which accommodates fluctuations in web velocity while maintaining a substantially constant tension in the paper web 412. Upon leaving the dancer assembly 411 the paper web passes over a web tension monitor 413 and thereafter passes into a paper web draw nip 417 formed by paper web pull rolls 414, 416. The tension in the web 412 sensed by the monitor 413 is used to control a drag brake 415 which is used to control the speed of the paper unwind from the paper roll 404 or 406. Drag brakes are conventional and well known in the art.

Figure 9:
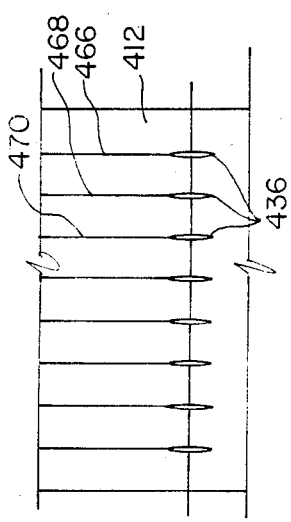
FIG. 9X illustrates a portion of a paper web and associated groove forming knives.
Figure 10:
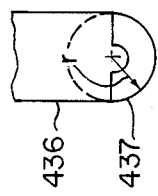
FIG. 10X illustrates an end portion of a groove forming knife.

The paper web pull rolls 414, 416 may both be driven rolls, but in the preferred embodiment only roll 416 is driven by an independent drive unit 421 which is electronically phase locked or "slaved" to the main drive unit 485. The nip 417 on the paper may be removed by retracting roll 414 from roll 416 as by cylinder unit 418 for facilitating system startup and maintenance procedures. Upon leaving the paper web nip 417 the paper passes over idler rolls 420, 422 and thereafter enters a lateral steering unit 423 comprising a pair of steering rolls 424, 426 which may be actuated to move in an axial direction with respect to one another by a control generated from a photoelectric or mechanical web edge sensing unit 427. Thereafter the paper web 412 passes over another idler roll 428 and thereafter over a tension monitor 430 which senses the tension in the paper web between the laminating nip 486 (described below) and the paper nip 417 and generates a control signal which is used to vary the speed of paper nip rollers 414, 416 to maintain a relatively constant tension in the paper web between the two nips 417, 486. After leaving the tension monitor, the paper web may pass through a web treater 432 of conventional construction which treats the paper as through application of an electric arc thereto to increase the adhesive properties thereof. Next, the paper web passes through a groove forming assembly 434 which provides parallel longitudinally aligned grooves 466, 468, 470, FIG. 9X, for facilitating application of longitudinal strings to the paper web. The grooves are formed by a plurality of roller-knife heads 436. Each knife head 436, as shown by FIG. 10X, comprises a wheel with a rounded groove-forming edge 437 which in one preferred embodiment has a radius "r" of approximately 0.10 inches. The groove-forming force applied to the paper web, by the knife edge is applied through use of a conventional pneumatic cylinder 437 or the like. A plurality of strings 442, 444, 446, etc. are provided from a string supply unit 440. Each individual string is supplied from a string spool, e.g., 448. In the preferred embodiment of the invention each spring spool 448 is mounted on a spool shaft 452 and is provided with a backup spool 450 on the same shaft to which it is connected to allow the string to be fed continuously without interruption. When one string spool 448 is depleted, the lower string spool 450 is urged upwardly and a third string spool (not shown) is mounted on the shaft 452 from the bottom and connected to the remaining string spool 450. A spool and shaft assembly is provided for each string which is to be inserted into the paper web. Each string passes through a conventional string tension control unit 454 which maintains a constant tension in the string as it is unwound from an associated spool. Each string passes through a string eyelet 460 and thence over one of a series of axially spaced apart upper pulleys 462 and thence around one of a series of axially spaced lower pulleys 464. Each string 442, 444, 446 passes into an associated groove 466, 468, 470, FIG. 9. The grooves formed in the paper have a sufficient depth so that the string inserted therein does not protrude substantially above the plane of the paper web surface which is to be laminated to the plastic film material. Thus the groove forming assembly provides a continuous threaded paper web which when laminated to associated plastic film web 550 provides a high-strength laminate with no visible string lines therein when viewed from the film side of the laminated composite. In most cases the film web is metalized or covered with other graphics and thus the string is completely invisible in the finished composite.

Upon passing through the string forming assembly 434 the paper web 412 with string embedded therein passes into a laminated nip 486 formed by a compression roll 480 which in the preferred embodiment is a chill roll having a rubber exterior 482 and a main chill roll 484 which in a preferred embodiment has a polished steel exterior. In the preferred embodiment only the main chill roll 484 is driven by a main drive unit 485. The laminating nip may be opened, as during startup and maintenance, by a laminating roll separator assembly 490 comprising a hydraulic cylinder unit 492 actuatable to pivot a pivot block 494 which supports the compression roll 480. An extruder 496, such as described in the previous embodiment, may be provided immediately above the laminating nip and may be adjustable to move slightly towards the paper infeed side of the nip, or slightly towards the film infeed side of the nip as may be required during different operating conditions. A hot melt adhesive 498 is dispensed from the extruder in the same manner as described above with respect to the first embodiment. A composite web 500 formed from the string embedded paper web 412 and the film web 550, described in further detail hereinafter, passes around the main chill roll 484 and over a take-off roll 502 which in the preferred embodiment is an idler roll. The take-off roll may be positioned at various heights by a variable height stand 504 which is varied in elevation as by a hand screw 506. By changing the elevation of the take-off roll 502 the wrap angle of the composite web 500 around the chill roll 484 may be varied thus allowing the amount of heat which is withdrawn from the composite web by the chill roll 484 to be varied according to operating conditions and physical characteristics of the particular composite being formed.

After leaving the take-off roll the composite web 500 passes over a series of idler rolls 508, 510, 512, 514, 516, 518, 520 and thereafter may pass below a powder applying hopper 522 which provides a controlled amount of powder, such as for example cornstarch, to the surface of the composite to facilitate later removal from the composite wind-up spool 531. Next the paper web passes through a conventional edge trimmer 524 which may be provided to trim off edge portions of the composite, e.g., the edge portion containing the monitoring marks 19, described in the embodiment above. Next the composite web passes over another idler roll 526 and then over a tension monitor roll 528 which provides a tension monitoring signal which is used to control the take-up speed of the composite wind-up spool 531. Next the composite passes into a composite wind-up unit 530 of conventional construction which may include a conventional shaft puller and lift table apparatus enabling the composite to be continuously wound up about a series of separate wind-up spools 531 without interruption.

Turning now to the film supply, it will be seen that the film is unwound from a conventional film unwind stand 540 from a film unwind spool 542 which may be lap-spliced with another film spool in proper repeat length registry to allow a continuous film supply to be provided by the film unwind stand 540. The method of providing a lap-splice between webs on spools is conventional and well known in the art. A film web 550 supplied from the film unwind stand passes over a series of idler rolls 552, 554, 556 and thence over a tension monitor 558 which generates a signal used to control a film unwind motor 557 to control the rate of film unwind. The film web next passes over a dancer assembly 560 of conventional type which cooperates with the film tension monitor and film unwind apparatus to maintain a relatively constant tension in the paper web portion between the film unwind stand 540 and a film nip 564. Film nip 564 is formed by a pair of film nip rolls 564, 566. In the preferred embodiment only one of the rolls 566 is driven by an independent drive motor 568. Upon leaving the film nip 565 the film web 550 passes over a series of idler rolls 560, 562, 564 and thence over a positioning idler 566 which provides a proper entry angle into the laminating nip 486. In this embodiment the film nip rolls 564, 566 replace the S-wrap rolls of the previous embodiment and provide the means for forming a relatively constant tension film web upstream portion between the film unwind and film nip and a controllably variable tension film downstream portion between the film nip and laminating nip. The speed differential between the film nip rolls 564, 566 and the laminating nip rolls 480 and 484 provides the stretch control in the same manner as described in previous embodiment. However, in this embodiment independent DC drive motors which are electronically phase-locked to the main drive unit 485 are used instead of a control motor coupled to a main drive unit by a mechanical differential.

It is contemplated that the inventive concepts herein described may be variously otherwise embodied and it is intended that the appended claims be construed to include alternative embodiments of the invention except insofar as limited by the prior art.

TABLE A

DEFINITION OF SYMBOLS

| Symbol for FIG. A | Description | Units |
|---|---|---|
| $\dot{\theta}_t$ | Control Motor (80) Angular Rate | rad/sec |
| $\ddot{\theta}_t$ | Control Motor (80) Angular Acceleration | rad/sec$^2$ |
| $R_a$ | Control Motor (80) Armature Resistance | Ohms |
| $K_t$ | Control Motor (80) Torque Constant | Ft-lb/Amp. |
| $K_{tt}$ | Control Motor Tachometer (81) Constant | Volts/rad/sec |
| $K_{td}$ | Drive Motor Tachometer (51) Constant | Volts/rad/sec |
| $K_b$ | Control Motor (80) EMF armature feedback constant | Volts/rad/sec |
| $K_{yf}$ | Speed Following Control Adjustment between chill roll laminating nip and S-wrap rollers | Volts/volt |
| $\dot{\theta}_{dm}$ | Drive Motor (50) angular rate | rad/sec |
| $\dot{\theta}_{d1}$ | Angular rate out of gear box (50) | rad/sec |
| $\dot{\theta}_{d2}$ | Angular rate sheave (62) | rad/sec |
| $\dot{\theta}_{cr}$ | Angular rate of laminator chill roll (26) | rad/sec |
| $K_1$ | Ratio of teeth number - sheave (56) over sheave (62) (e.g. 28/36) | unitless |
| $K_2$ | Ratio of teeth number - sheave (64) over sheave (68) (e.g. 26/72) | unitless |
| $D_1$ | Diameter of laminating chill roll (26) (e.g. 23.625/12) | Feet |
| $K_3$ | Ratio of teeth number - sheaves (72) over sheave (74) (e.g. 60/60) | unitless |
| $K_4$ | Gear Ratio from drive motor input to differential output (e.g. 100/101) | unitless |
| $I_{tm}$ | Inertia of Trim Motor rotating parts | lb.-Ft.-sec$^2$ |
| $K_5$ | Gear Ratio from trim motor input to differential output (e.g. 1/101) | unitless |
| $\dot{\theta}_{di}$ | Angular rate of drive motor input into differential | rad/sec |
| $C_1$ | Conversion factor between rad/sec and RPM (e.g. 60/2) | RPM/rad/sec |
| $K_6$ | Ratio of teeth number - sheave (84) over sheave (88) (e.g. 60/72) | unitless |
| $K_7$ | Ratio of teeth number - sheave (92) over sheave (94) (e.g. 44/44) | unitless |
| $D_s$ | Diameter of S-wrap rolls (32, 34) | Feet |
| $\dot{X}_{cr}$ | Surface speed of the laminating chill roll (26) | FPM |
| $\dot{X}_s$ | Surface speed of the S-wrap rolls (32, 34) | FPM |
| $K_{d/a}$ | Ratio analog volts to digital number (e.g. 1/512) | volts/unit |
| $L_{rl}$ | Length of the graphics repeat | inches |
| $\Delta L_{rl}$ | Incremental change in length of graphics repeat | inches |
| $\omega_o$ | Break frequency of derivative circuit | rad/sec |
| $\omega_d$ | Break frequency of 1st order lag approximation of LDPE recovery (snapback) | rad/sec |
| $E^1$ | Effective modulus of elasticity for film (including the effect of softening the film in the laminating nip by application of hot adhesive) | lbs/in$^2$ |
| t | Processing film thickness | inches |
| W | Processing film width | inches |
| $T_f$ | Tension added to film due to stretch between the S-wrap nip and the laminating nip | lbs. |
| RL | Actual repeat length of printed image on the film including the incremental stretch | inches |
| $T_T$ | A discrete time period for the transport lag in the closed loop control due to the distance between the control point (S-wrap nip) and the | seconds |

TABLE A-continued
DEFINITION OF SYMBOLS

| Symbol for FIG. A | Description | Units |
|---|---|---|
| | measured point on the laminated nip. Varies with line speed | |
| T | A time period between the sampled repeat length marks on the film web. Varies with line speed. | seconds |
| n | Number of repeat lengths sampled between up-dates at the repeat length averaging circuitry. | units |
| $\Sigma$ | Summation of descrete values | unitless |
| RL* | Measured value of each repeat in encoder counts | counts |
| RL** | Averaged value of repeat length per update out of the repeat length averaging circuitry | counts |
| RL**≡L | Digital value of the repeat length processed and ready for input to micro computer | digital word |
| $K_{d/a}$ | Digital to analog conversion constant | volts/digital unit |
| S | Laplace operator | 1/seconds |
| RPM | Revolutions per minute | |
| I(T) | Repeat Length error at sample T | inches |
| O3(T) | Control Algorithm output as a function of fine and coarse mode corrections | Digital word |
| O4 | Digital work output to digital-to-analog converter for driving trim motor | Digital word |
| T | Sample number taken from the repeat length measurement processor | Interger |
| V | Average velocity of web computed from web repeat length measurements and time increments between those measurements | FPM |
| Vn | Web velocity at the "n"th sample back from current sample | FPM |
| A | Time increment | Seconds |
| A0 | Absolute time of last sample | Hour, Min., Seconds |
| $A^1$ | Absolute time of current sample | Hour, Min., Seconds |
| N | Number of measured repeat lengths averaged in the repeat length averaging circuitry. (e.g. N is 2, 5 or 10.) | Interger |
| R | Ideal Repeat length of printed image of extensible film | inches |
| L,L1 | Measure value of repeat length of printed image of extensible film | inches |
| O1 | Output of lead-lag control algorithm for fine mode, O0 is previous value of O1. | Digital word |
| E1 | Output of integration control algorithm for fine mode, E0 is previous value of E1 | Digital word |
| B1 | Output of integration control algorithm for coarse mode, B0 is previous value of B1 | Digital word |
| O2 | Output of coarse control algorithm after multiplied by gain term | Digital word |
| K1 | Gain term that varies with sample | Digital word |
| K2 | Gain term that compensates control loop gain as a function of web stretch variation due to change of web velocity | Digital word |
| D1 | Dummy word used as first value out of repeat length processor before an actual measurement has been made. D1 is set to zero | Digital word |
| C1,C2,C3 & C4 | Fine mode algorithm constants arrived at by system stability analysis | Digital word |
| K | Summation of gain terms K1, K2 and system gain | Digital word |
| B | Bias introduced manually from keyboard function keys | Digital word |
| I | Increment and decrement for each closure of function key to change control bias for stretch or relax | Digital word |
| C5 | Gain term that changes web speed velocity to sample frequency | |

```
 10 ! ΣΣΣΣΣΣΣΣΣΣΣΣΣΣΣΣΣΣΣΣΣΣ
 20 ! ΣΣΣΣΣΣΣΣΣΣΣΣΣΣΣΣΣΣΣΣΣΣ
 30 ! ΣΣΣΣΣΣΣΣΣΣΣΣΣΣΣΣΣΣΣΣΣΣ
 40 ! ΣΣΣΣΣΣΣΣΣΣΣΣΣΣΣΣΣΣΣΣΣΣ
 50 ! ******* RLEN 6 *******
 60 !
 70 ! PROGRAM NAME, VERSION AND
 80 ! DATE OF LAST REVISION
 90 !
100 ! PROGRAM IS SETUP FOR LDPE
110 ! AN EXTENSIBLE FILM
120 !
130 CLEAR
140 DISP "         COMPOSITE      "
150 DISP "          PILOT LINE"
160 DISP "         REPEAT LENGTH"
170 DISP "        CONTROL PROGRAM"
180 DISP "         VERSION  1.04"
190 DISP "          28 JUNE 1983"
200 DISP " "
210 DISP " "
220 DISP " "
230 DISP " "
240 DISP " "
250 DISP " "
260 !
270 ! =====DIMENSIONING======
280 ! ==========OF===========
```

```
290 ! ====PROGRAM VARIABLES==
300 !
310 SHORT I(3000),O3(3000)
320 SHORT C1,C2,C3,C4,C5
330 SHORT K,K1,K2,E0,E1,L,L1,R
340 SHORT O0,O1,O2,B1,B0
350 SHORT V,V0,V1,V2,V3,V4
360 REAL A,A0,A1
370 INTEGER T,B,I,O4,N,D1
380 !
390 ! =======SETTING=========
400 ! ==========OF===========
410 ! ====PROGRAM CONSTANTS==
420 !
430 D1=0
450 C1=1.667
460 C2=1
470 C3=.333
480 C4=.08
490 !
500 ! =====OPERATOR SELECTS==
510 ! =======CONTROL=========
520 ! ==========MODE=========
530 !
540 DISP "    SELECT MODE OF CONTROL"
550 OFF KEY# 4
560 ON KEY# 2," MANUAL" GOSUB 1650
570 ON KEY# 3,"  AUTO" GOTO 600
580 KEY LABEL
590 GOTO 550
600 GOSUB 2340
610 !
620 ! ==OPERATOR INPUTS DATA=
630 ! =========FOR THE=======
640 ! ===AUTO CONTROL MODE===
650 !
660 DISP "ENTER THE NUMBER OF VALUES THAT"
670 DISP "  ARE TO BE STORED IN THE MEI"
680 DISP "BUFFER AND VERIFY THAT THE MEI"
690 DISP " INTERFACE UNIT  IS SET TO THE"
700 DISP "       SAME VALUE"
710 DISP "       (2,5 OR 10)"
720 INPUT N
730 IF N<>2 AND N<>5 AND N<>10 THEN 600
740 GOSUB 2340
750 DISP "ENTER THE NOMINAL REPEAT LENGTH"
760 DISP "    OF THE PRODUCT (INCHES)"
770 DISP ""
780 INPUT R
790 GOSUB 2340
800 DISP ""
810 DISP "*******************************"
820 DISP ""
830 DISP "    INITIALIZATION COMPLETE"
840 DISP ""
850 DISP "    READY FOR MACHINE START"
860 DISP ""
870 DISP "*******************************"
880 !
890 ! CLEAR INTERFACE VALUE
900 ENTER 410 USING "#,W" ; D1
910 !
920 ! ===INITIALIZING========
930 ! ==PROGRAM VARIABLES====
940 ! ==PRIOR TO ENTERING====
950 ! =ALGORITHM CONTROL LOOP
960 !
970 T=1
980 A0=TIME
990 V,V0,V1,V2,V3,V4,E0,E1=0
1000 O0,O1,I(T),I(T-1),O2,O4=0
1010 B0,B1,O3(T)=0
1020 C5=.055/(R*N)
1030 !
1040 ! =TAKING REPEAT LENGTH=
1050 ! ====VALUES FROM========
1060 ! ==MEI INTERFACE BOX===
1070 ! =====================
1080 !
1090 ! =COMPUTING:TIME;
1100 ! =REPEAT ERROR; WEB
1110 ! =SPEED; AND GAINS AS A
1120 ! =FUNCTION OF LINE SPEED.
1130 !
1140 !
1150 !
1160 ! GET VALUE FROM MEI
1170 ENTER 410 USING "#,W" ; L
1180 GOSUB 2440
1190 IF L=0 THEN 1170
1200 A1=TIME
1210 A=A1-A0
1220 IF A>6 THEN GOSUB 2160
1230 IF L>0 THEN 1250
1240 L=L+65536
1250 L=L/1000
1260 L=10*L/N
1270 L1=L
1280 V4=5*N*L1/A
1290 V=(V0+V1+V2+V3+V4)/5
1300 IF T>3000 THEN 2080
1320 I(T)=R-L
1325 GOSUB 1990
1330 IF ABS(I(T))>1.5 THEN I(T)=I(T-1)
1335 IF T=1 THEN 1350
1340 IF T<4 THEN GOSUB 2170
1350 IF ABS(I(T))>=.1 THEN 1430
1360 ! LEAD-LAG CONTRL ALGORITHM
1370 !
1380 O1=C1*I(T)-C2*I(T-1)+C3*O0
1390 !
1400 ! INTEGRATION ALGORITHM
1410 !
1420 E1=E0+C4*O1+C4*O0
1430 K1=.12+C5*V
1440 K2=.004*V
1450 K=K1*K2*4
1460 IF ABS(I(T))<.1 THEN 1490
1470 B1=B0+.1*I(T)+.1*I(T-1)
1480 O2=K*B1
1490 O3(T)=(O1+E1)*K+O2
1500 IF V<50 THEN O3(T)=0
1510 O4=INT(512*O3(T))+1024
1520 IF O4>4095 THEN O4=4095
1530 IF O4<0 THEN O4=0
1540 OUTPUT 410 USING "#,W" ; O4
1550 GOSUB 2180
1560 GOTO 1170
1570 !
1580 !
1590 !
1600 ! %%%%%%%SUBROUTINE%%%%%%
1610 ! %MANUAL CONTROL OF REPEAT
1620 ! %%%WITH FUNCTION KEYS%%%
1630 ! %%%%%%%%%%%%%%%%%%%%%%%%
```

```
1640 !
1650 I=13
1660 B=512
1670 CLEAR
1680 DISP "****   MANUAL CONTROL
     MODE   ****"
1690 DISP " "
1700 DISP " "
1710 DISP "    CHANGE THE REPEAT
     LENGTH"
1720 DISP "       IN INCREMENTS
     OF"
1730 DISP "     .005 INCH (NOMIN
     AL)"
1740 OFF KEY# 2
1750 OFF KEY# 3
1760 ON KEY# 2,"STRETCH" GOTO 18
     10
1770 ON KEY# 3,"  RELAX" GOTO 18
     60
1780 ON KEY# 4," RETURN" GOTO 1
     30
1790 KEY LABEL
1800 GOTO 1760
1810 ! ****    STRETCH    ****
1820 B=B+I
1830 IF B>4095 THEN B=4095
1840 OUTPUT 410 USING "#,W" ; B
1850 GOTO 1760
1860 ! ****     RELAX     ****
1870 B=B-I
1880 IF B<0 THEN B=0
1890 OUTPUT 410 USING "#,W" ; B
1900 GOTO 1760
1910 !
1920 ! %%%%%%SUBROUTINE%%%%%%%
1930 ! %%INTERFACE BOX LIGHTS
1940 ! GRN RL ERR LESS THAN .02
1950 ! ORG RL ERR MORE THAN .02
1960 ! %%%%%%%%%%%%%%%%%%%%%%%
1970 ! %%%%%%%%%%%%%%%%%%%%%%%
1980 !
1990 IF ABS(I(T))>.02 THEN OUTPU
     T 410 USING "#,W" ; 4096 EL
     SE OUTPUT 410 USING "#,W" ;
     8192
2000 RETURN
2010 !
2020 ! %%%%%%SUBROUTINE%%%%%%%
2030 ! %%INTERFACE BOX LIGHTS%%
2040 ! %FOR REPEAT THRESHOLD%%%
2050 ! %TURN OFF WHEN DATA%%%%%
2060 ! %%%BUFFER IS FULL%%%%%%
2070 !
2080 CLEAR
2090 DISP "DATA BUFFER IS FULL"
2100 DISP "END PROGRAM"
2110 OUTPUT 410 USING "#,W" ; 12
     288
2120 GOTO 2390
2130 !
2140 ! %%%%%%SUBROUTINE%%%%%%%
2150 ! %INCREMENTING VARIABLES%
2160 ! %%%%%%%%%%%%%%%%%%%%%%%
2170 !
2180 A0=A1
2190 IF A>6 THEN 1170
2200 V0=V1
2210 V1=V2
2220 V2=V3
2230 V3=V4
2240 E0=E1
2250 O0=O1
2251 B0=B1
2260 T=T+1
2270 IF T<=4 THEN 1170
2280 RETURN
2290 !
2300 ! %%%%%%SUBROUTINE%%%%%%%
2310 ! %%DISPLAY FOR AUTO MODE%
2320 ! %%%%%%%%%%%%%%%%%%%%%%%
2330 !
2340 CLEAR
2350 DISP "****   AUTO CONTROL M
     ODE    ****"
2360 DISP " "
2370 DISP " "
2380 RETURN
2390 END
2400 !
2410 ! %%%%%%SUBROUTINE%%%%%%%
2420 ! %%%DUMPING DATA FROM%%%
2430 ! %%%%%%%%BUFFER%%%%%%%%%
2440 ON KEY# 1,"" GOTO 2460
2450 RETURN
2460 FOR X=1 TO 3000
2470 ON KEY# 1,"" GOTO 900
2480 PRINT X;"    ";I(X);"    ";O3(X
     )
2490 NEXT X
2500 !
2510 !
2520 ! ΣΣΣΣΣΣΣΣΣΣΣΣΣΣΣΣΣΣΣΣΣΣΣΣ
2530 ! ΣΣΣΣΣΣΣΣΣΣΣΣΣΣΣΣΣΣΣΣΣΣΣΣ
2540 ! ΣΣΣΣΣΣΣΣΣΣΣΣΣΣΣΣΣΣΣΣΣΣΣΣ
2550 ! ΣΣΣΣΣΣΣΣΣΣΣΣΣΣΣΣΣΣΣΣΣΣΣΣ
```

What is claimed is:

1. A high speed laminating apparatus for laminating plastic film material to a paper material to form a laminating composite the film material passing through the apparatus in continuous longitudinally extending web having an upstream portion entering the apparatus and a downstream portion exiting the apparatus; the film material normally being extensibly deformable such that the longitudinal distance between any two reference points on the film web may vary during lamination; the apparatus comprising:

paper supply unwind roll means for providing a continuous supply of paper to be laminated;

film supply unwind roll means for providing a continuous supply of film to be laminated;

laminating nip means, for drawingly engaging said film web and said paper web in parallel touching contact whereby each said web is moved at the same web speed, and for bondingly compressing said film web to said paper web to form a laminated composite;

film web stretch control means positioned between said laminating nip means and said film supply unwind roll means for frictionally engaging said film web and for varying the web velocity of the portion of the film web passing therethrough relative to the velocity of the laminating nip for selectively stretching or shrinking the film web portion passing between the film web stretch control means and the laminating nip means during continuous movement of the film web through the laminating nip means;

film length monitoring means for measuring the length of predetermined portions of said film web at a position downstream said laminating nip means and for providing a monitor signal to a data processing means;

data processing means for comparing said monitor signal to a predetermined length value and providing command signals responsive there to said film web stretch control means for imparting a predetermined amount of stretch or relaxation to said film web whereby predetermined portions of said film web are continuously extensibly adjusted to a predetermined length;

paper supply speed control means for controlling the rate at which paper is supplied from said paper unwind roll means for providing relatively constant tension in a length of paper web positioned between said paper unwind roll means and said laminating nip means;

film supply speed control means for controlling the rate at which film is supplied from said film unwind means wherein said film supply speed control means is actuated to provide a film web speed at said film supply means substantially equal to the film web speed at said film web stretch control means whereby a first substantially constant film tension zone is provided in said film web between said film supply means and said film web stretch control means and a second variable tension zone is provided in said film web between said film web stretch control means and said laminating nip means;

composite web speed control means for controlling the speed of said composite web for providing relatively constant tension in said composite web immediately downstream of said laminating nip means.

2. The invention of claim 1 wherein said film web stretch control means comprises S-wrap roll means.

3. The invention of claim 1 wherein said film supply speed control means comprises a drag brake.

4. The invention of claim 3 wherein said film supply speed control means further comprises a dancer means operably associated with said film web in said first tension zone.

5. The invention of claim 1 further comprising string insertion means for inserting string into the surface portion of said paper web that is to be bonded to said film web in continouous longitudinally extending strands at a position upstream of said laminating nip whereby a substantially flat laminated composite having string embedded between said paper web and said film web is provided.

6. The invention of claim 5 further comprising knife means for grooving said paper web for facilitating insertion of said string.

7. The invention of claim 6 further comprising continuous string feed means for feeding string to said grooves in said paper web.

8. The invention of claim 1 wherein said data processing means comprises a microcomputer.

9. The invention of claim 1 wherein said film length monitoring means comprise:

detection means for detecting the passage of preprinted indicia on said film web at a position downstream of said second motive means and for providing a detection signal to said data processing means in response thereto; and machine speed monitoring means for providing a machine speed reference signal proportional to said paper web speed to said data processing means.

10. The invention of claim 9 wherein said detection means comprises at least one photoelectric means for generating an electric pulse signal in response to a preprinted mark in said film web passing through a fixed beam of light.

11. The invention of claim 10 wherein said photoelectric means comprises a single photoelectric unit wherein said data processing means computes the distance between detected marks based on the number of high frequency pulses generated by said pulse train generating means between consecutive detection pulses signals.

12. The invention of claim 11 wherein said detection means comprises two spaced apart photoelectric units wherein the spacing of said photoelectric units is a predetermined distance;

and wherein said data processing means computes the difference between said predetermined distance between photoelectric units and the distance between detected marks by counting the number of pulses in a continuous machine speed pulse train provided by said machine speed monitoring means, between the separate detection pulses input by said spaced apart photoelectric units whereby error from a predetermined design spacing is calculated.

13. A method of laminating paper sheet material in roll form to plastic film sheet material in roll form by use of an adhesive material comprising the steps of:

mounting a roll of the paper sheet material on a first feed roll;

mounting a roll of the film sheet material on a second feed roll;

simultaneously, continuously unwinding the roll of paper sheet material and the roll of film sheet material to provide a length of paper sheet material and a length of film sheet material;

simultaneously continuously advancing the length of paper sheet material and the length of the film sheet material to a laminating station comprising a main roll means and a compression roll means defining a nip area therebetween and an adhesive applying means located adjacent the nip area for laminating the film sheet material to be paper sheet material;

continuously applying adhesive material between the paper sheet material and the film material in the nip area;

applying pressure to the paper sheet material and the film sheet material and the adhesive material during passage through the nip area to form a fixed lamination;

passing the length of film sheet material past adjustable tensioning means located between the lamination station and the feed roll means to stretch or relax the length of film material passing therethrough;

continuously adjusting the unwind speed of the film sheet material from the second feed roll to provide a relatively constant tension in the film material between the second feed roll and the adjustable tensioning means;

continuously adjusting the unwind speed of the paper sheet material from the first feed roll to provide a relatively constant tension in the paper material between the first feed roll and the laminating station;

continuously adjusting the rate of lamination web takeup from the laminating station to provide a relatively constant tension in the lamination web immediately downstream of the lamination station;

sampling the distance between fixed indicia on the lamination downstream of the laminating station and generating a control signal representative of that distance; and adjusting the tensioning means in accordance with the control signal, so as to maintain the distance between indicia on the film sheet material within a predetermined tolerance.

14. The method of claim 13 including the step, simulataneously with the step of applying pressure to the paper sheet material and the film sheet material during passage through the laminating area, of:

withdrawing heat from the paper sheet material and the film sheet material and the adhesive sheet material during passage through the nip area to form a fixed lamination.

15. The invention of claim 14 wherein the step of sampling the distance between fixed indicia on the lamination comprises the steps of:

monitoring the speed of the lamination and generating a speed based control signal in response thereto;

monitoring the passage of the fixed indicia on the lamination at a monitoring station downstream of the laminated station and generating a time-based control signal in response thereto;

calculating the distance between the fixed indicia by comparing said time based signal and said speed based signal.

16. The invention of claim 15 wherein the method of continuously monitoring the speed of said lamination includes the step of continuously monitoring the rotational speed of a rotating means.

17. The invention of claim 15 wherein the method of continuously monitoring the speed of said lamination includes the step of continuously monitoring the rotational speed of a rotating means which is drivingly linked to the main roll means.

18. The invention of claim 13 wherein the step of adjusting the tensioning means in accordance with the control signal comprises the step of adjusting the tension in a first length of film sheet material in a first tension area located upstream of the laminating station with respect to the tension of a second length of film sheet material in a second tension area located upstream of the first tension area.

19. The invention of claim 18 wherein the method of adjusting the tension in the film in the first tension area with respect to the film in the second tension area comprises adjusting the velocity of the first length of film sheet material at a first end of the first tension area with respect to the velocity of the first length of film material at a second end of the first tension area.

20. The invention of claim 19 wherein the method of adjusting the speed of the first length of film material at the first end and second end of the first tensioning area comprise adjusting the rotational velocity of a first set of nip effect producing rollers with respect to a second set of nip effect producing rollers.

21. The invention of claim 19 wherein the method of adjusting the speed of the first length of film material at the first end and second end of the first tension area comprises adjusting the rotational velocity of a first set of nip effect producing rollers with respect to the rotational velocity of the main roll.

22. The invention of claim 1 wherein said film web stretch control means comprises nip roll means.

* * * * *